United States Patent
Gavas et al.

(10) Patent No.: US 12,462,411 B2
(45) Date of Patent: Nov. 4, 2025

(54) METHOD AND SYSTEM FOR PREDICTING DISTANCE OF GAZED OBJECTS USING INFRARED (IR) CAMERA

(71) Applicant: Tata Consultancy Services Limited, Mumbai (IN)

(72) Inventors: Rahul Dasharath Gavas, Bangalore (IN); Tince Varghese, Bangalore (IN); Ramesh Kumar Ramakrishnan, Bangalore (IN); Rolif Lima, Bangalore (IN); Priya Singh, Bangalore (IN); Shreyasi Datta, Bangalore (IN); Somnath Karmakar, Kolkata (IN); Mithun Basaralu Sheshachala, Bangalore (IN); Arpan Pal, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/656,863

(22) Filed: May 7, 2024

(65) Prior Publication Data
US 2024/0386590 A1  Nov. 21, 2024

(30) Foreign Application Priority Data

May 17, 2023 (IN) .............................. 202321034600

(51) Int. Cl.
*G06T 7/55* (2017.01)
*G06T 7/73* (2017.01)
(Continued)

(52) U.S. Cl.
CPC .................. *G06T 7/55* (2017.01); *G06T 7/73* (2017.01); *G06V 10/30* (2022.01); *G06V 10/32* (2022.01);
(Continued)

(58) Field of Classification Search
CPC ... G06T 7/55; G06T 7/73; G06T 2207/10048; G06T 2207/20081; G06T 2207/30201;
(Continued)

(56) References Cited

U.S. PATENT DOCUMENTS 7,460,940 B2 * 12/2008 Larsson ................. G06V 40/18
701/45
7,748,847 B2  7/2010 Dai
(Continued)

OTHER PUBLICATIONS

Lee et al: "Estimating Gaze Depth Using Multi-Layer Perceptron", 2017 International Symposium on Ubiquitous Virtual Reality (ISUVR), IEEE, Jun. 27, 2017 (Jun. 27, 2017), pp. 26-29, XP033128944, DOI: 10.1109/ISUVR.2017.13 [Retrieved on May 20, 2025] (Year: 2017).*

(Continued)

*Primary Examiner* — Peet Dhillon
(74) *Attorney, Agent, or Firm* — FINNEGAN, HENDERSON, FARABOW, GARRETT & DUNNER LLP

(57) ABSTRACT

This disclosure relates generally to method and system for predicting distance of gazed objects using IR camera. Eye tracking technology is widely used to study human behavior and patterns in eye movements. Existing gaze trackers focus on predicting gaze point and hardly analyzes distance of the gazed object from the gazer or directly classify region of focus. The method of the present disclosure predicts gazed objects distance using a pair of IR cameras placed on either side of a smart glass. The gaze predictor ML model predicts distance at least one gazed object positioned from eye of each subject during systematic execution of a set of tasks. From each pupillary information of each pupil a set of features are extracted which are utilized to classify the gazed object of the subject based on the distance into at least one of a near class, an intermediate class, and a far class.

15 Claims, 20 Drawing Sheets

(51) Int. Cl.
*G06V 10/30* (2022.01)
*G06V 10/32* (2022.01)
*G06V 10/764* (2022.01)
*G06V 10/774* (2022.01)
*G06V 40/18* (2022.01)

(52) U.S. Cl.
CPC .......... *G06V 10/764* (2022.01); *G06V 10/774* (2022.01); *G06V 40/193* (2022.01); *G06T 2207/10048* (2013.01); *G06T 2207/20081* (2013.01); *G06T 2207/30201* (2013.01)

(58) Field of Classification Search
CPC ........ G06V 10/30; G06V 10/32; G06V 10/52; G06V 10/143; G06V 10/764; G06V 10/774; G06V 40/193; G06V 40/197
See application file for complete search history.

(56) References Cited

U.S. PATENT DOCUMENTS

| | | | |
|---|---|---|---|
| 9,380,224 B2 | 6/2016 | Keskin et al. | |
| 2016/0270656 A1* | 9/2016 | Samec | A61B 3/1035 |
| 2019/0099075 A1* | 4/2019 | Gavas | A61B 5/7257 |
| 2020/0022577 A1* | 1/2020 | Rishoni | G06F 3/0236 |
| 2020/0364539 A1* | 11/2020 | Anisimov | G06F 3/011 |
| 2022/0007934 A1* | 1/2022 | Raymond | A61B 3/18 |
| 2022/0236797 A1* | 7/2022 | Drozdov | G06V 10/82 |
| 2022/0265502 A1* | 8/2022 | Yeo | A61H 5/005 |
| 2022/0360847 A1* | 11/2022 | Chukoskie | A61B 3/113 |
| 2023/0309860 A1* | 10/2023 | Komeilipoor | A61B 5/7267 600/301 |
| 2023/0334326 A1* | 10/2023 | Haimovitch-Yogev | G06N 3/04 |
| 2024/0315548 A1* | 9/2024 | Brügger | A61B 3/113 |
| 2025/0004283 A1* | 1/2025 | Foster | H04N 23/20 |
| 2025/0064365 A1* | 2/2025 | De Villers-Sidani | G06T 7/0016 |

OTHER PUBLICATIONS

Padmanaban et al., "Autofocals: Evaluating gaze-contingent eyeglasses for presbyopes," Sci. Adv., 5:eaav6187 (2019).
Wang et al., "Object-Gaze Distance: Quantifying Near-Peripheral Gaze Behavior in Real-World Applications," Journal of Eye Movement Research, 14(1):5 (2021).

* cited by examiner

PERSONALIZATION: Please enter your vision powers

|  | Left Eye | Right Eye |
|---|---|---|
| What is your reading power ? | +2 | +1 |
| What is your intermediate power ? | 0 | +0.5 |
| What is your distant vision power ? | -4 | -2 |

Submit

FIG.11B

METHOD AND SYSTEM FOR PREDICTING DISTANCE OF GAZED OBJECTS USING INFRARED (IR) CAMERA

PRIORITY CLAIM

This U.S. patent application claims priority under 35 U.S.C. § 119 to: Indian Patent Application No. 202321034600, filed on May 17, 2023. The entire contents of the aforementioned application are incorporated herein by reference.

TECHNICAL FIELD

The disclosure herein generally relates to gazed object distance, and, more particularly, to method and system for predicting distance of gazed objects using infrared (IR) camera.

BACKGROUND

Human visual system is the most advanced and superior in estimating the depth both in terms of quality and generalization. Eye tracking technology is widely used to study human behavior and patterns in eye movements given specific target stimulus such as videos, web pages, computer games, books, and the like. Human vision is a complex system that makes it possible to receive and process information from an external environment. Applications like augmented reality (AR), virtual reality (VR), and smart wearable technology are becoming more popular as a result of eye tracking.

Eye tracking application enables human machine interaction for dynamic object tracking in a video in order to define an area of interest. Various methods have been devised for tracking user eye focus or gaze. Gaze depth estimation has numerous applications in the areas of augmented reality, human machine interaction, scene understanding, optics, scientific research, and analysis. However, a robust and accurate estimation of gaze depth is a very challenging problem. Existing gaze tracking methods identifies certain features of the eye positions to compute a gaze direction or gaze point. Such existing gaze trackers are focused on predicting the point of gaze and hardly address analyzing distance of the gazed object from the gazer or directly classify region of focus. Existing systems lack in providing gaze depth estimation lack robustness and accuracy. Also, existing techniques proposes the use of heavy and bulky head mounted hardware which is cumbersome to use and requires additional processing.

SUMMARY

Embodiments of the present disclosure present technological improvements as solutions to one or more of the above-mentioned technical problems recognized by the inventors in conventional systems. For example, in one embodiment, a system for predicting distance of gazed objects using infrared (IR) camera is provided. The system includes pretraining a gaze predictor ML model to predict distance of at least one gazed object positioned from eye of each subject during a systematic execution of a set of tasks. The one or more IR images of each eye of each subject are received as input for fixed duration as input from a pair of IR cameras configured to either side of a spectacle. Further, one or more pupillary image information from each pupil are acquired for each eye from the one or more IR images. Further, a set of features are extracted from each pupillary information of each pupil, and eye blinks from the set of features is denoised. Further, a distance of a gazed object from current location of the subject is predicted using the gaze predictor ML model and the set of features. Finally, the gazed object of the subject is classified based on the distance into at least one of a near class, an intermediate class, and a far class.

In another aspect, a method for predicting distance of gazed objects using infrared (IR) camera is provided. The system includes pretraining a gaze predictor ML model to predict distance of at least one gazed object positioned from eye of each subject during a systematic execution of a set of tasks. The one or more IR images of each eye of each subject are received as input for fixed duration as input from a pair of IR cameras configured to either side of a spectacle. Further, one or more pupillary image information from each pupil are acquired for each eye from the one or more IR images. Further, a set of features are extracted from each pupillary information of each pupil, and eye blinks from the set of features is denoised. Further, a distance of a gazed object from current location of the subject is predicted using the gaze predictor ML model and the set of features. Finally, the gazed object of the subject is classified based on the distance into at least one of a near class, an intermediate class, and a far class.

In yet another aspect, a for predicting distance of gazed objects using infrared (IR) camera is provided. The non-transitory computer readable medium pretrains a gaze predictor ML model to predict distance of at least one gazed object positioned from eye of each subject during a systematic execution of a set of tasks. The one or more IR images of each eye of each subject are received as input for fixed duration as input from a pair of IR cameras configured to either side of a spectacle. Further, one or more pupillary image information from each pupil are acquired for each eye from the one or more IR images. Further, a set of features are extracted from each pupillary information of each pupil, and eye blinks from the set of features is denoised. Further, a distance of a gazed object from current location of the subject is predicted using the gaze predictor ML model and the set of features. Finally, the gazed object of the subject is classified based on the distance into at least one of a near class, an intermediate class, and a far class.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 11B illustrates an real life application of RFD correction where the subject enters their vision power details before using the system of FIG. 1, in accordance with some embodiments of the present disclosure.

DETAILED DESCRIPTION

Figure 1:
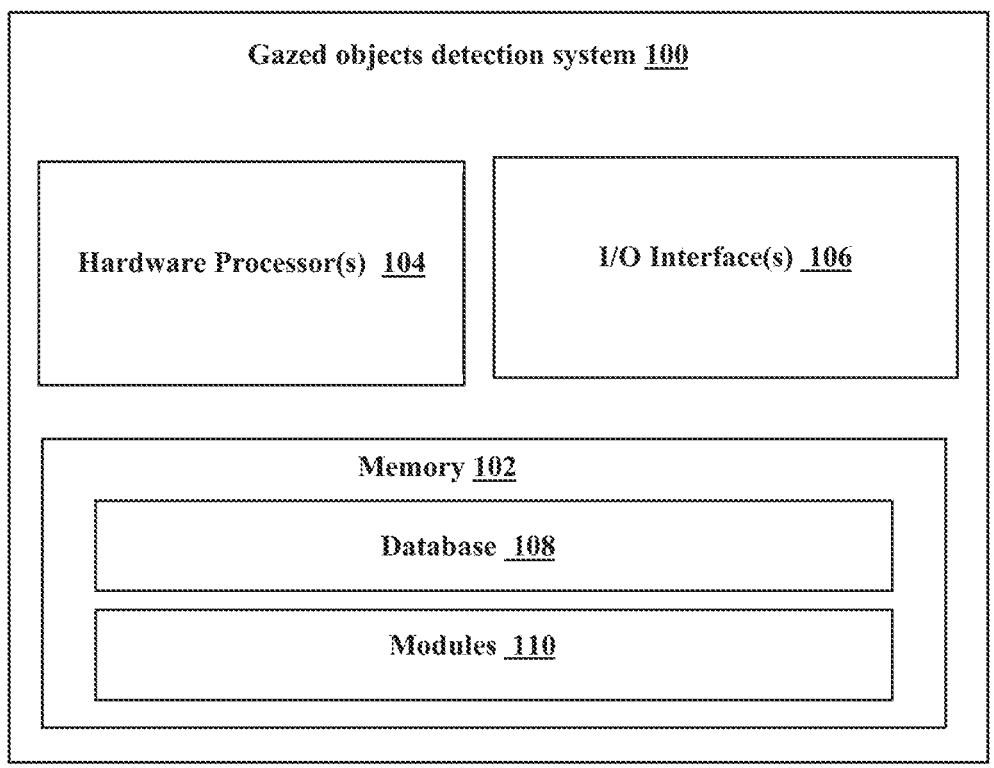
FIG. 1 illustrates an exemplary system (alternatively referred as gazed objects distance prediction system) according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Human visual system is a complex system that makes it possible to receive and process information from external environment. It helps humans to understand and navigate world as one of the primary modes of interaction. Human visual system carries out a series of processes, right from light rays falling into the eyes till we perceive what we are seeing. Accommodation of the eye is one such important process that aids in focusing on objects present at varying distances. It remains a cornerstone of human visual experience as it enriches our understanding of attention and intention, which is paramount for understanding and predicting human behavior. Accurately understanding and modeling this capacity has numerous implications, particularly in fields like human-computer interaction, virtual and augmented reality, and other accessibility technologies.

But with time, human lose the capability of maintaining focus on near objects, which is called presbyopia condition. Almost everyone experiences some degree of presbyopia and it usually arises after the age of 40. Presbyopia along with the near-sightedness defect are known as refractive defects of vision (RFD). It has a significant impact on an individual's quality of life and emotional state. It becomes challenging for an individual suffering from this condition to function properly in any environment. Hence, there is a need for RFD correction with newer advanced technological tools and algorithms. In order to correct vision, people largely use bifocals, progressive glasses or reading glasses. The distance of the gazed entity if determined, can aid a person by actuating feedback via smart eyewear with dynamic lenses for assisting the person in their vision.

Furthermore, progressives can perform poorly when conducting tasks requiring side-to-side head movement and suffer from astigmatism in the periphery. Reading or computer glasses avoid these issues, but people often avoid them because of the inconvenience of carrying multiple pairs of glasses, or worse, forgetting the other pair. Last, mono vision and simultaneous-vision contacts fall short when compared to bifocals and single-vision glasses on metrics such as visual acuity, stereo acuity, and near-distance task performance. This has left a critical gap in understanding and technological replication of human depth perception.

One of the promising solution to the stated problem is the use of dynamic or focus tunable lenses along with eye tracking technologies. The distance of the gazed entity if determined using eye tracking, can aid a person by actuating feedback via smart eyewear with dynamic lenses for assisting the person in their vision.

Existing eye tracking technology (camera based) available in the market is only able to provide a two-dimensional (2D) or XY coordinates of gaze estimation that maps a vector indicative of the angle of viewing into the 2D plane at a fixed distance. They do not provide an indication of the actual distance of viewing (depth perception).

Embodiments herein provide a method and system for predicting distance of gazed objects using IR camera. The system provides a gazed objects distance predictor using a pair of IR cameras. The system enables providing a robust scalable low cost gazed predictor ML model to determine distance of object of interest and corresponding actual distance gazed by a subject. The system utilizes an IR camera-based setup without any additional hardware, thereby making it easy to use and applicable for deployment scenarios. This further predicts a likelihood of subject gazing into at least one of a near distance, intermediate distance, and a far-off distance by performing a model classification comprising near, far, and intermediate distance levels. The method of the present disclosure employs for example a smart glass having a pair of IR cameras positioned on lenses of each smart glass. The method includes training a gaze predictor machine learning (ML) model utilizing domain knowledge based eye features comprising a pupil orientation feature and a pupil dilation feature captured through video frames by performing systematic execution of tasks. Further, the trained gaze predictor machine learning model is utilized to classify the distance of the gazed objects from the current location of the subject based on the set of features.

The system 100 requires only a pair of light weight, inexpensive IR cameras resulting robust, real-time gaze depth estimation solution which leverages the properties of physiological characteristic of eyes while fixating at different distances. The method also address the problem of refractive defects of vision and propose the subsequent use of our gaze depth estimation algorithm in correcting this condition. The results in this work establishes the robustness of the proposed system to retrieve depth information from eye images. The disclosed system is further explained with the method as described in conjunction with FIG. 1 to FIG. 11C below.

Referring now to the drawings, and more particularly to FIG. 1 through FIG. 11C, where similar reference characters denote corresponding features consistently throughout the figures, there are shown preferred embodiments, and these embodiments are described in the context of the following exemplary system and/or method.

FIG. 1 illustrates an exemplary system 100 (alternatively referred as gazed objects distance prediction system) according to some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a user interface, a tracking dashboard to display performance of the enterprise application, and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
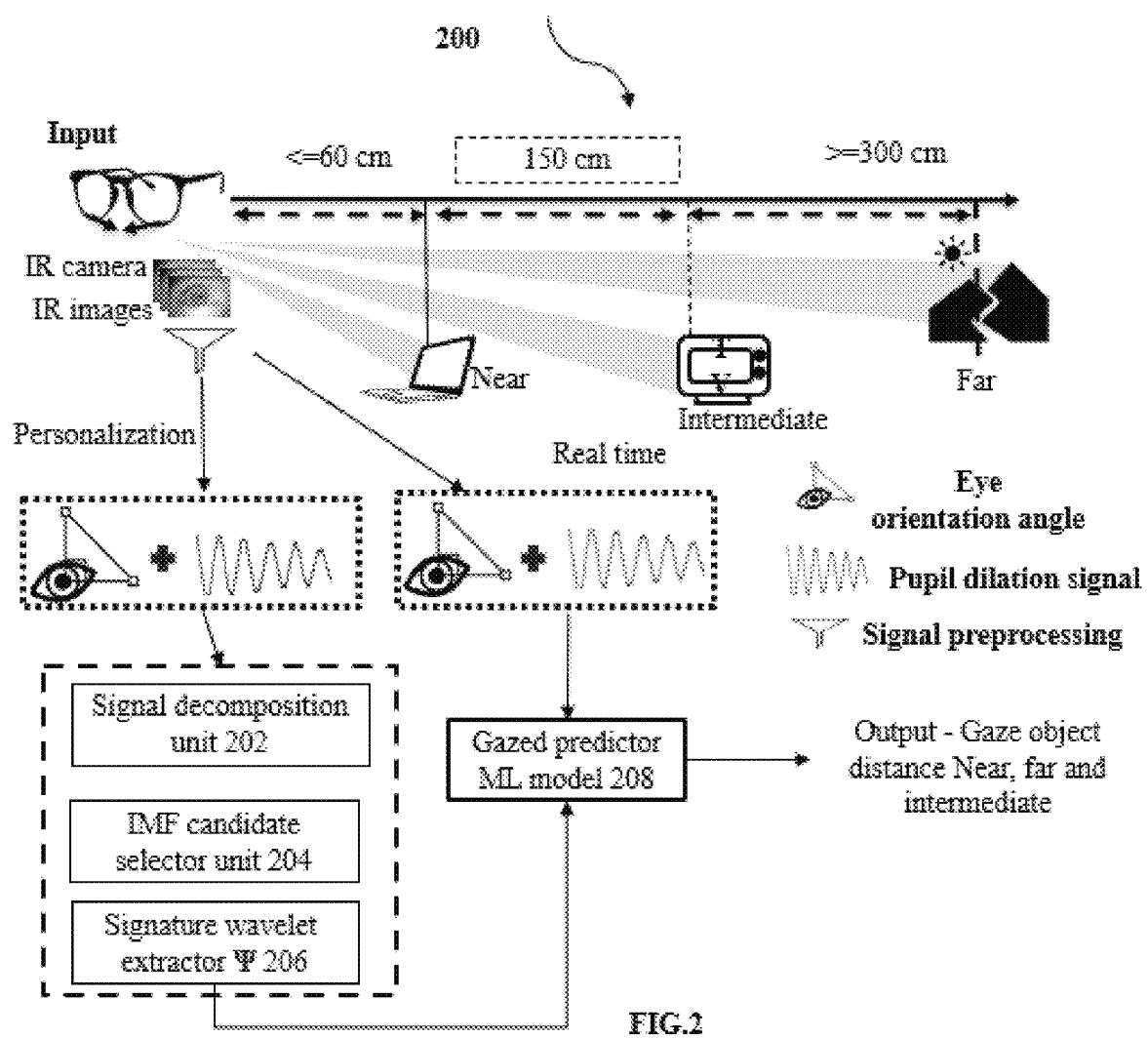
FIG. 2 is a functional block diagram for predicting distance of gazed objects using the system of FIG. 1, in accordance with some embodiments of the present disclosure.

In an embodiment, the memory 102 includes a plurality of modules 110 such as an signal decomposition unit 202, IMF candidate selector unit 204, a signature wavelet extractor 206, and so on as depicted in FIG. 2. The plurality of modules 110 include programs or coded instructions that supplement applications or functions performed by the system 100 for executing different steps involved in the process of predicting distance of gazed objects using the IR camera, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Further, the memory 102 may comprise information pertaining to input(s)/output(s) of each step performed by the processor(s) 104 of the system 100 and methods of the present disclosure. Further, the memory 102 includes a database 108. The database 108 stores a first stimulus data and a second stimulus data. In normal real life scenarios, humans generally have lower vergence angles (angle made by two eyes on the gazed object) for near and it increases with distance. The first stimulus data is when the subject gazes at objects at different heights. The second stimulus data is captured from digitally controlled motorized forward-backward moving apparatus which carries a white circular plate with a black fixation dot where the objects are at same height. The datastore helps to record all stimulus data for training the gaze predictor ML model 208.

The database (or repository) 108 may include a plurality of IR camera images that is processed, received, or generated as a result of the execution of the plurality of modules in the module(s) 110. Although the database 108 is shown internal to the system 100, it will be noted that, in alternate embodiments, the database 108 can also be implemented external to the system 100, and communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to FIG. 2 and steps in flow diagrams in FIG. 3.

FIG. 2 illustrates an architectural overview of the system of FIG. 1, in accordance with some embodiments of the present disclosure. The FIG. 2 depicts a signal decomposition unit 202, IMF candidate selector unit 204, a signature wavelet extractor 206 and a gaze predictor ML model 208.

The system 100 receives one or more IR camera images as input which are further processed to determine distance of the gazed object from current location of the subject. The one or more IR camera images are fetched by further components of the system 100.

The signal decomposition unit 202 of the system 100 decomposes the given pupil dilation signal into one or more intrinsic mode functions (IMFs), where each IMF is centered around a compact center frequency.

The IMF candidate selector unit 204 of the system 100 selects the IMF that has maximum information pertaining to the gazed depth. This IMF is termed as the signature wavelet.

The signature wavelet extractor 206 of the system 100 extracts or performs the convolution of the signature wavelet with that of each pupil dilation signal or feature collected in runtime to maximize the gazed distance information by suppressing the rest of the unwanted information.

The gaze predictor ML model 208 of the system 100 is pretrained to predict distance of at least one gazed object positioned from eye of each subject during a systematic execution of a set of tasks. The gaze predictor ML model 208 is pretrained using a training data where a pair of IR cameras captures a set of input images from a set of video frames continuously located at either side of lenses of the spectacle for example a smart glass. Each IR camera captures the continuous images of one of the eyes. Here, a Python-based inhouse audio stimulus is created to guide the subjects to gaze at one of the 3 target objects placed at 3 different distances ranging as Near (50 cm) class, Intermediate (150 cm) class and Far (300 cm) class. The subjects are required to gaze at each object for a duration of about 3 seconds and this is followed by an eye close state for another 3 seconds. Each of these 10 such trials constitute a session. The generated training data is fed into the system to process inputs received as inputs during testing phase.

Figure 3:
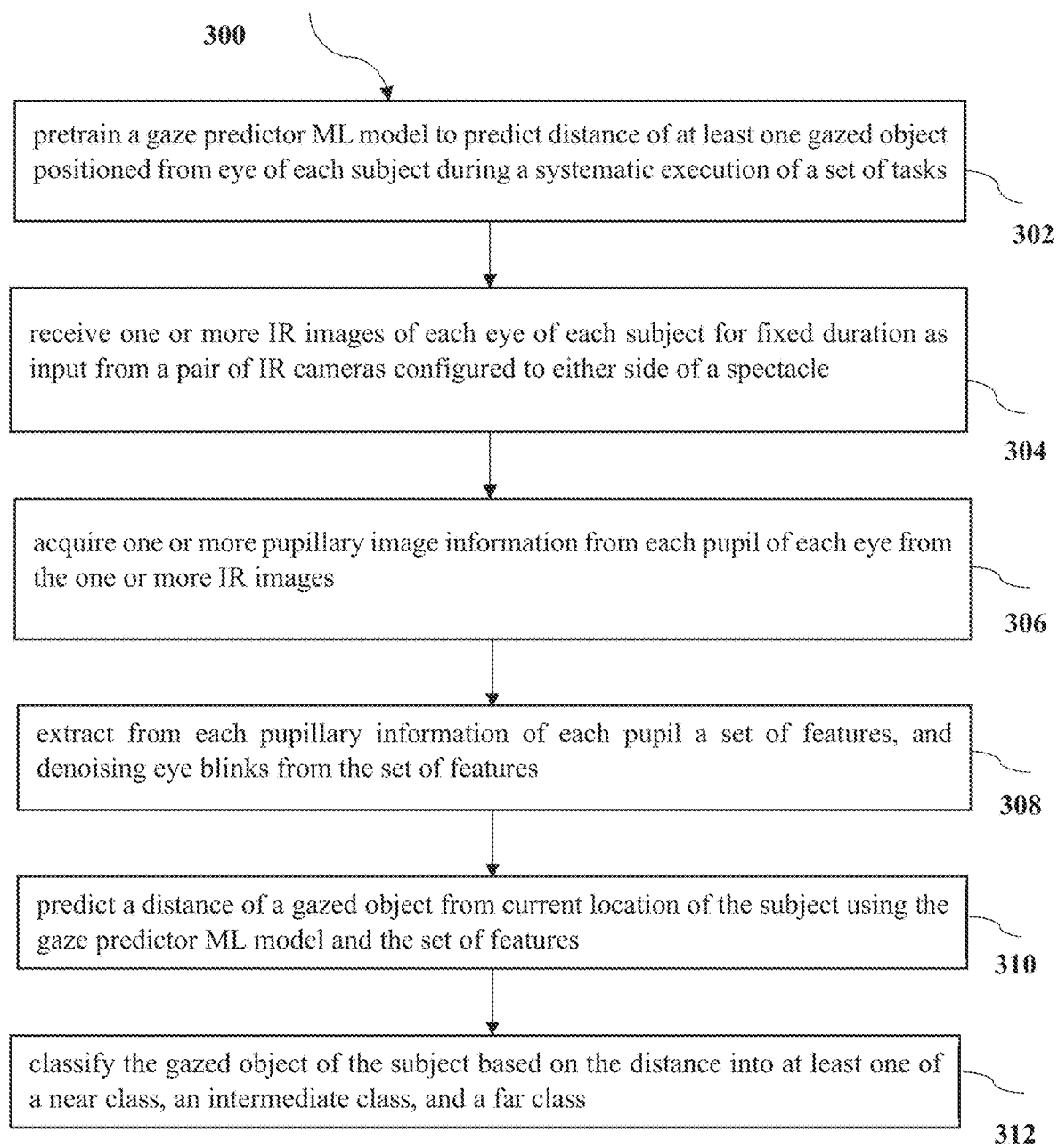
FIG. 3 illustrates a flowchart of a process for predicting distance of gazed objects using IR camera images using the system of FIG. 1, in accordance with some embodiments of the present disclosure.

FIG. 3 illustrates a flowchart of a process for predicting distance of gazed objects using IR camera images using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 and FIG. 2, the steps of flow diagram as depicted in FIG. 3 and a use case example of presbyopia suffering subjects to check distance of gazed objects to analyze sight in FIG. 4. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to FIG. 3 and the steps of the method 300, at step 302 of the method 300, the one or more hardware processors 104 are configured to pretrain a gaze predictor ML model to predict distance of at least one gazed object positioned from eye of each subject during a systematic execution of a set of tasks.

The gaze predictor ML model 208 of the system 100 is pretrained using different training datasets referred as a first stimulus and a second stimulus. The first stimulus data and the second stimulus data are generated from each subject by performing the systematic execution of the set of tasks where the subject gazes at the object. The data collection process is performed by executing series of tasks which are detailed in further embodiments.

In normal real life scenarios, humans generally have lower vergence angles (angle made by two eyes on the gazed object) for near and it increases with distance. The first stimulus is designed using the hypothesis where the object is placed at 3 different heights and distances to test the effect of angular placement of objects on the distance prediction. To test this further, in the second stimulus objects are placed at three different distances but at the same height and line of sight from subject.

Figure 4A:
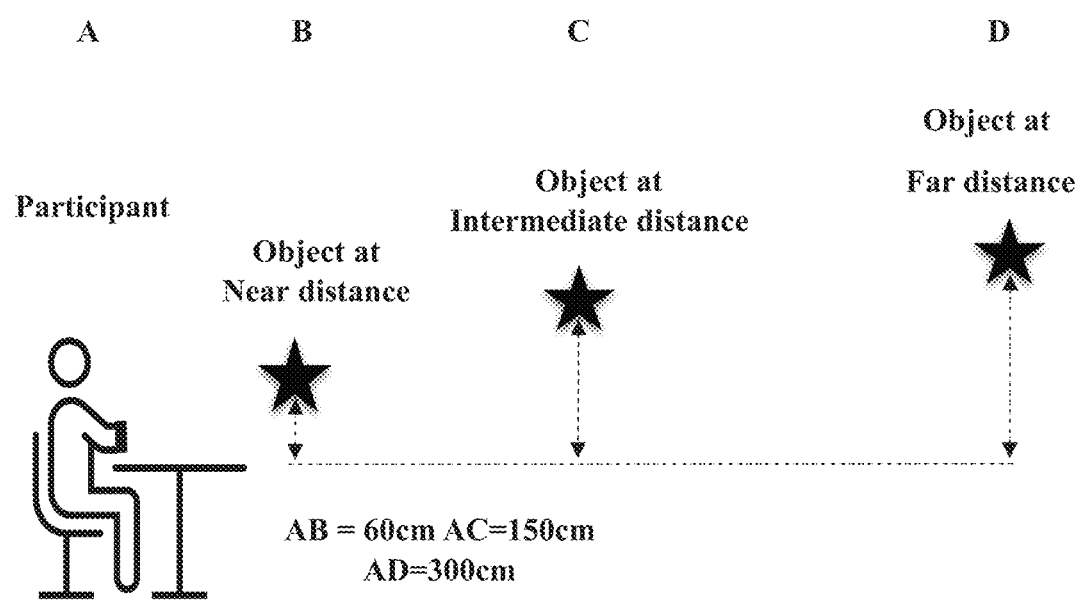
FIG. 4A illustrates a first stimulus paradigm where a subject gazes at fixed object using the system of FIG. 1, in accordance with some embodiments of the present disclosure.

Referring now to FIG. 4A, the first stimulus data is collected where the subject is seated at a fixed position A and three objects are placed at locations B, C and D at distances 60 cm (Near), 150 cm (Intermediate) and 300 cm (Far) from the subject, respectively. The objects at these three locations are placed at different heights, emulating real world scenario. A timed audio stimulus is played through an inhouse-designed kiosk which calls out the object name after every five seconds. The subject is supposed to gaze at that object until they hear the next instruction. Five such trials are conducted with each trial comprising of gazing at the three objects independently. A closed eye session succeeds every trial for a period of five seconds.

Figure 4B:
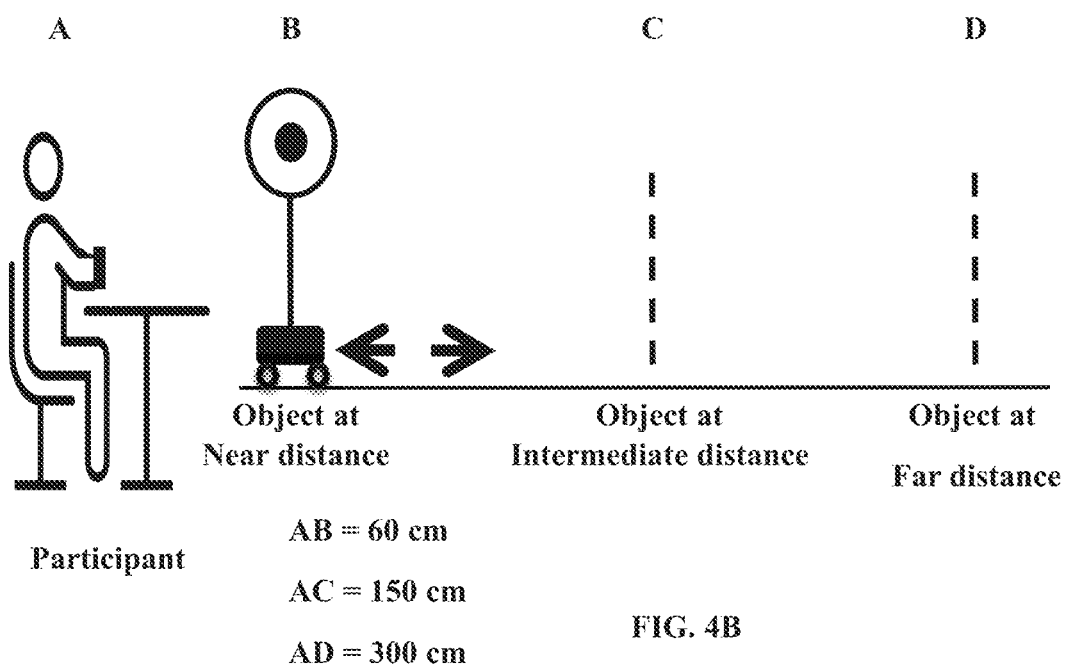
FIG. 4B illustrates a second stimulus paradigm where the subject gazes at forward-backward moving object using the system of FIG. 1, in accordance with some embodiments of the present disclosure.

Referring now to FIG. 4B, the second stimulus data is collected where a digitally controlled motorized, forward-backward moving apparatus is developed in-house which carries a white circular plate with a black fixation dot. It is programmed in such a manner that it halts at each of the three distances at B, C and D (B, C, D are in same line of sight) for a fixed duration of five seconds. The participant is supposed to gaze at the fixation dot.

Once the training dataset are collected, it is further utilized to extract a set of features from each pupillary information of each eye image. The set of features comprises a pupil orientation feature and a pupil dilation feature. Firstly, the pupil orientation feature is normalized corresponding to a baseline pupil orientation signal obtained during initial calibration phase when the subject gazes at the object from the current location to the far distance.

Secondly, the training dataset is utilized to extract the pupil dilation signal feature by executing the steps of where initially the pupil dilation signal is normalized using the baseline pupil dilation signal, wherein the baseline pupil dilation signal is obtained during the initial calibration phase when the subject gazes at the object from the current location to the far distance. Then, the pupil dilation signal is enhanced with a convolution of signature wavelet, wherein the signature wavelet is estimated during the initial calibration phase when subject gazes at the object from the current location to the far distance.

Further, the baseline pupil dilation signal is inputted into a variational Mode Decomposition (VMD) technique which decomposes the baseline pupil dilation signal into discrete modes where each mode is compact with center frequency to obtain an intrinsic mode functions (IMFs) for each mode as output.

Then, optimization is performed around each intrinsic mode functions (IMFs) which is an ideal signature wavelet capturing the gaze distance of the object from the current location to the far distance. Finally, the pupil dilation feature is enhanced in runtime where each pupil dilation feature subjected to convolution with the signature wavelet to maximize gazed depth related component in the signal and to suppress the rest.

At step 304 of the method 300 the one or more hardware processors are configured to receive one or more IR images of each eye of each subject for fixed duration as input from a pair of IR cameras configured to either side of a spectacle.

Referring to an example where the subject has presbyopia and requires solution for correction using auto tunable smart lens at low cost. Human eye orientation changes while gazing at different depths. The system 100 receives one or more IR images of each eye of each subject as input which are further processed in next embodiment.

At step 306 of the method 300 the one or more hardware processors are configured to acquire one or more pupillary image information from each pupil of each eye from the one or more IR images. For the above example the one or more pupillary image information from each pupil of each eye is acquired from the one or more IR images.

Now at step 308 of the method 300 the one or more hardware processors are configured to extract from each pupillary information of each pupil a set of features, and denoising eye blinks from the set of features.

Here, for the above example each pupillary information of each pupil includes a major axis (M), and a minor axis (m) which is obtained from both the IR eye video frames separately. The window of duration 300 milliseconds (as a fixation duration window) is considered for making prediction and this window should not comprise of noise.

Figure 5:
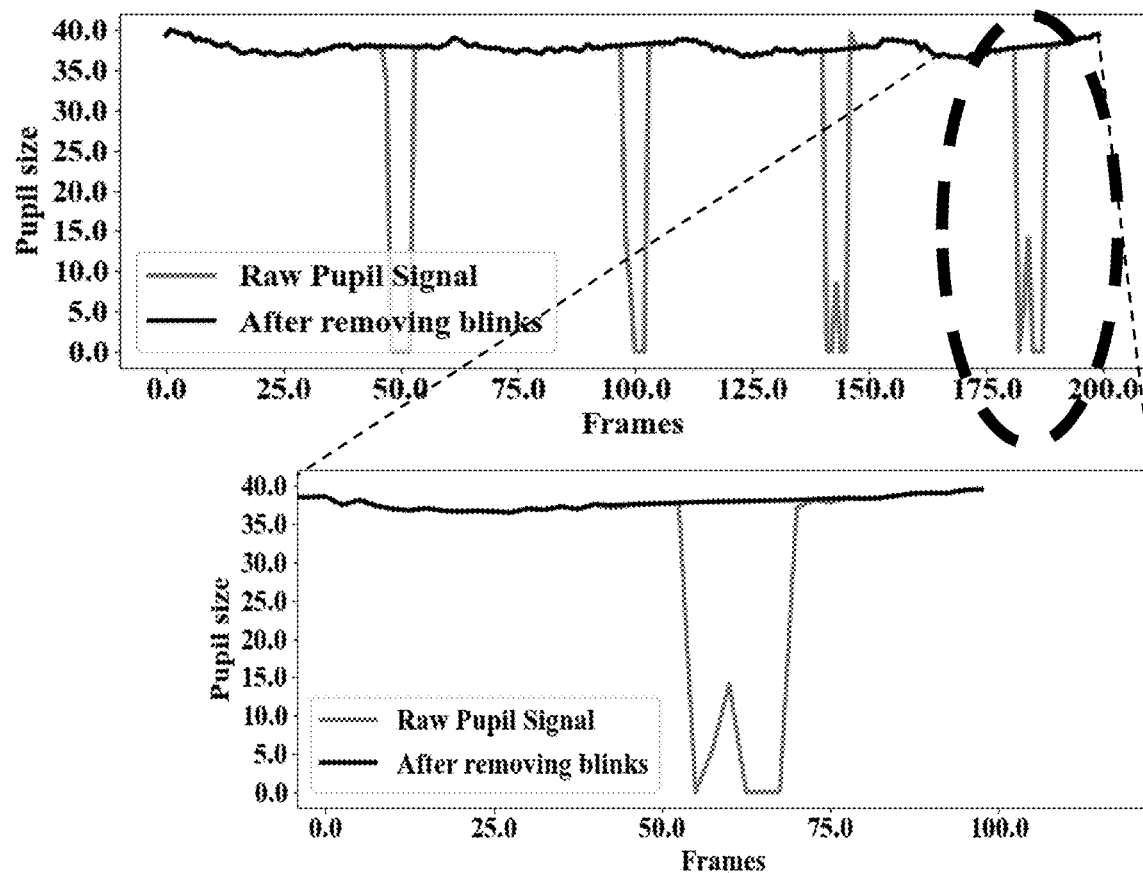
FIG. 5 illustrates a pupillary signal information before removing eyeblinks and after removing eye blinks from the set of IR eye image features using the system of FIG. 1, in accordance with some embodiments of the present disclosure.

Referring now to FIG. 5, where the eyeblinks are removed from the one or more IR images. The signal of each IR image from the gaze tracker is considered as x={1, 2, 3, . . . , N} dumps zeroes during the blink portions. This leads to loss of information in the data.

For example, let $\hat{x} \leftarrow x$ where let $\hat{x}$ is a copy of the signal x. Let the event in time a blink is detected be t. A buffer window of 150 ms given by $\delta$, defines the region of influence (ROI) of the blink at t in the signal. This ROI is defined by the interval $[t-\delta, t+\delta]$ as represented in Equation 1, $$\hat{x}[t-\delta, t+\delta] = y_L + \frac{(x_j - x_L)(y_R - y_L)}{(x_R - x_l)} \quad \text{Equation 1}$$

$\forall j=1, 2, 3, \ldots, P$ number of samples at any ROI in the duration $[t-\delta, t+\delta]$. $(x_L, y_L)$ is the leftmost data point in the ROI and $(x_L, y_L)$ is the rightmost point in the ROI. Further, standard Savgol filter is applied on this new signal $\hat{x}$ as in Equation 2, $$\hat{x}_t = \sum_{i=\frac{1-m}{2}}^{\frac{m-1}{2}} C_i, \hat{x_{t+1}}; \quad \frac{m+1}{2} \leq j \leq N - \frac{m-1}{2} \quad \text{Equation 2}$$

The Savgol filter smoothens the data in the window in which it is applied in order to avoid sharp points in the ROI. The ROIs in the signal x is now replaced with the corresponding ROI regions from $\hat{x}$ as in Equation 3, $$x[t-\delta, t+\delta] = \hat{x}[t-\delta, t+\delta] \quad \text{Equation 3}$$

Thus, the signal x is blink free signal and can be used for further analysis.

At step 310 of the method 300 the one or more hardware processors are configured to predict a distance of a gazed object from current location of the subject using the gaze predictor ML model and the set of features.

Figure 6A:
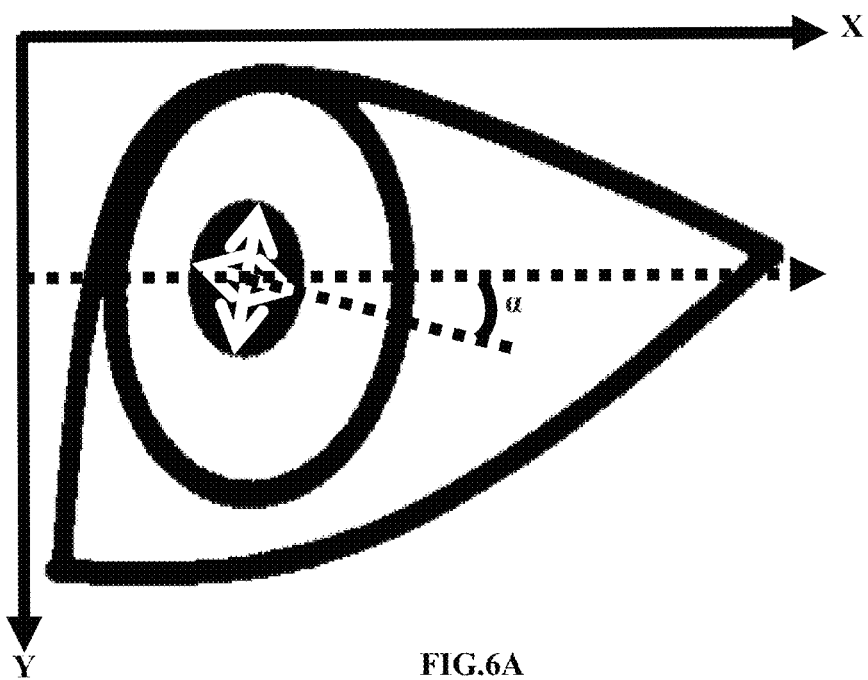
FIG. 6A illustrates a first feature which is a pupil orientation angle feature extracted from the IR images of each eye using the system of FIG. 1, in accordance with some embodiments of the present disclosure.

In another embodiment, referring now to FIG. 6A hypothesized angular orientations termed as angle $\alpha$, to extract the pupil orientation feature from each pupillary information of each pupil is hypothesized that each pupil follows a certain angular orientation while gazing at different distance. Initially, each pupillary image information is projected in a 2D plane. When the pupil image is projected onto the image in the XY plane as shown in FIG. 6A the angle $\alpha$ which is the angle between the minor and the horizontal of the image, varies with the gaze depth or distance. Further, the angle ($\alpha$) for each pupillary image information is computed, wherein the $\alpha$ angle is an angle between a minor axis and a horizontal component of at least one eye of the subject gazing the angle. Furthermore, the angle ($\alpha$) is denoised from the eye blinks and sine of the ($\alpha$) angle is taken to extract the pupil orientation feature from the angle ($\alpha$).

Figure 6B:
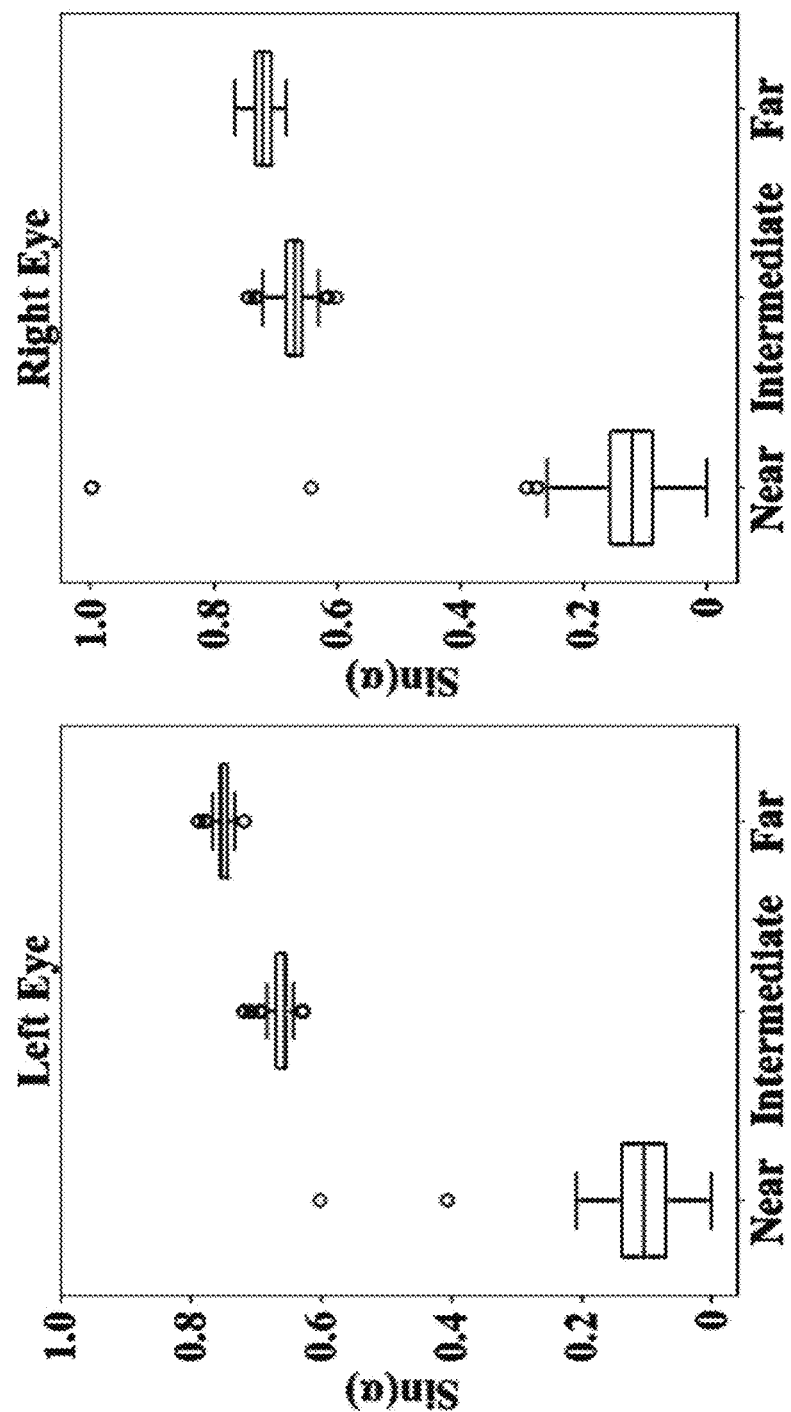
FIG. 6B illustrates signature wavelet representation of the pupil dilation signal feature into intrinsic mode functions using a variational mode decomposition technique when the subject gazes at near, intermediate, and far objects from a left and a right eye using the system of FIG. 1, in accordance with some embodiments of the present disclosure.

In another embodiment, referring now to FIG. 6B in real world scenarios, the computed angle $\alpha$ shows the boxplot for near, intermediate, and far classes. The pupil orientation feature sin ($\alpha$) serves two purposes, (i) Firstly as a feature to classify Near and Far gazed distance and (ii) Secondly as a parameter to estimate a vertical component of pupil size time series extraction. Further the pupil orientation feature is normalized corresponding to baseline signal for gaze depth estimation. The baseline pupil orientation feature as the far data which is collected when a participant gazes at Far distance in the initial calibration phase. The mean $\mu$ and standard deviation $\sigma$ from the baseline pupil orientation signal are stored for normalization of each pupil orientation signals consecutively.

In another embodiment to extract the pupil dilation feature for each pupil of each eye involves estimation of vertical component of pupillary signal, followed by normalization of the signal using a custom defined signature wavelet as discussed in the next embodiment. Pupillary vertical axis estimation: The pupil image within the IR eye image is usually elliptical, owing to the orientation of the face. It becomes circular when the eye is aligned to the center of the camera. When the pupil shape appears to be elliptical, we get the major and minor axis as the two measures of pupil size. Vertical component of pupil size in the image space is an important feature for gaze depth estimation which we identified through experimentation. With eye movements, the major and minor axes could dynamically interchange between vertical and horizontal components of the image space. It is critical to continuously identify which axis is vertical in order to extract the feature. The said problem is solved from an image perspective having the horizontal (H) and the vertical (V) component of pupil size, which is an interplay of major and minor axes, respectively. Here, β as a function of sine of the angle as in Equation 4

$$\beta_i = \sin(\alpha_i) \quad \text{Equation 4}$$

∀i=1, 2, 3, . . . , N number of eye image frames. The mapping of minor (m) and major (M) axes into H or V timeseries is carried out as defined in Equation 5, $$f(m_i, M_i) = \begin{cases} H_i = m_i \\ V_i = M_i, & \text{if } \beta_i \le 1 - \beta_i \\ H_i = M_i \\ V_i = m_i, & \text{otherwise} \end{cases} \quad \text{Equation 5}$$

The new timeseries V is considered as pupil dilation signal for computing the gaze depth. The baseline signature extraction is described where the human vision is mainly designed for Far distance. Hence, the pupil dilation signal is collected when the subject is gazing at the Far distance in the initial calibration phase as the baseline pupil dilation signal. The mean μ and standard deviation σ from this baseline pupil dilation signal are stored for further normalization of further pupil dilation signals. The baseline signal comprises of many hidden frequency components and extraction and identification of components of interest is a non-trivial task. The variational mode decomposition (VMD) decomposes each signal x(t) into K discrete modes $u_k$. Here, each mode is compact along its center frequency $w_k$. The technique is to solve a constrained variational function to search for $w_k$ and $u_k$ which is given in Equation 6, $$\min\left\{\left\|\sum_k \partial_t\left[\left(\delta(t)+\frac{j}{\pi t}\right)*u_k(t)\right]e^{-j\omega_k t}\right\|_2^2\right\} \text{ subject to } \sum_k u_k = x \quad \text{Equation 6}$$

The working of VMD algorithm is as follows. Given the required number of modes K, set the initial parameters, $u_k^1$, $w_k^1$, $\lambda^1$ and n to 0. Update n with n+1 and repeat the following steps. For every k=1 through K, update $u_k$, $w_k$ as described in Equation 7 and Equation 8, $$u_k^{n+1}(\omega) = \frac{x(\omega) - \sum_{i<k} u_i^n(\omega) - \sum_{i>k} u_i^n(\omega) + \left(\frac{\lambda^n(\omega)}{2}\right)}{1 + 2a(\omega - \omega_k^n)^2} \quad \text{Equation 7}$$

$$\omega_k^{n+1} = \frac{\int_0^\infty \omega |u_k^{n+1}(\omega)|^2 d\omega}{\int_0^\infty |u_k^{n+1}(\omega)|^2 d\omega} \quad \text{Equation 8}$$

The above updates are repeated until the following convergence is achieved as in Equation 9, $$\sum_{k=1}^K \frac{\|u_k^{n+1} - u_k^n\|_2^2}{\|u_k\|_2^2} < \epsilon \quad \text{Equation 9}$$

These processes yield the modes $u_k$ which are band limited in nature (compact around a center frequency) and the sum of these modes equals the original input signal. Hence, these modes are called as band limited intrinsic mode functions (BLIMFs).

Figure 6C:
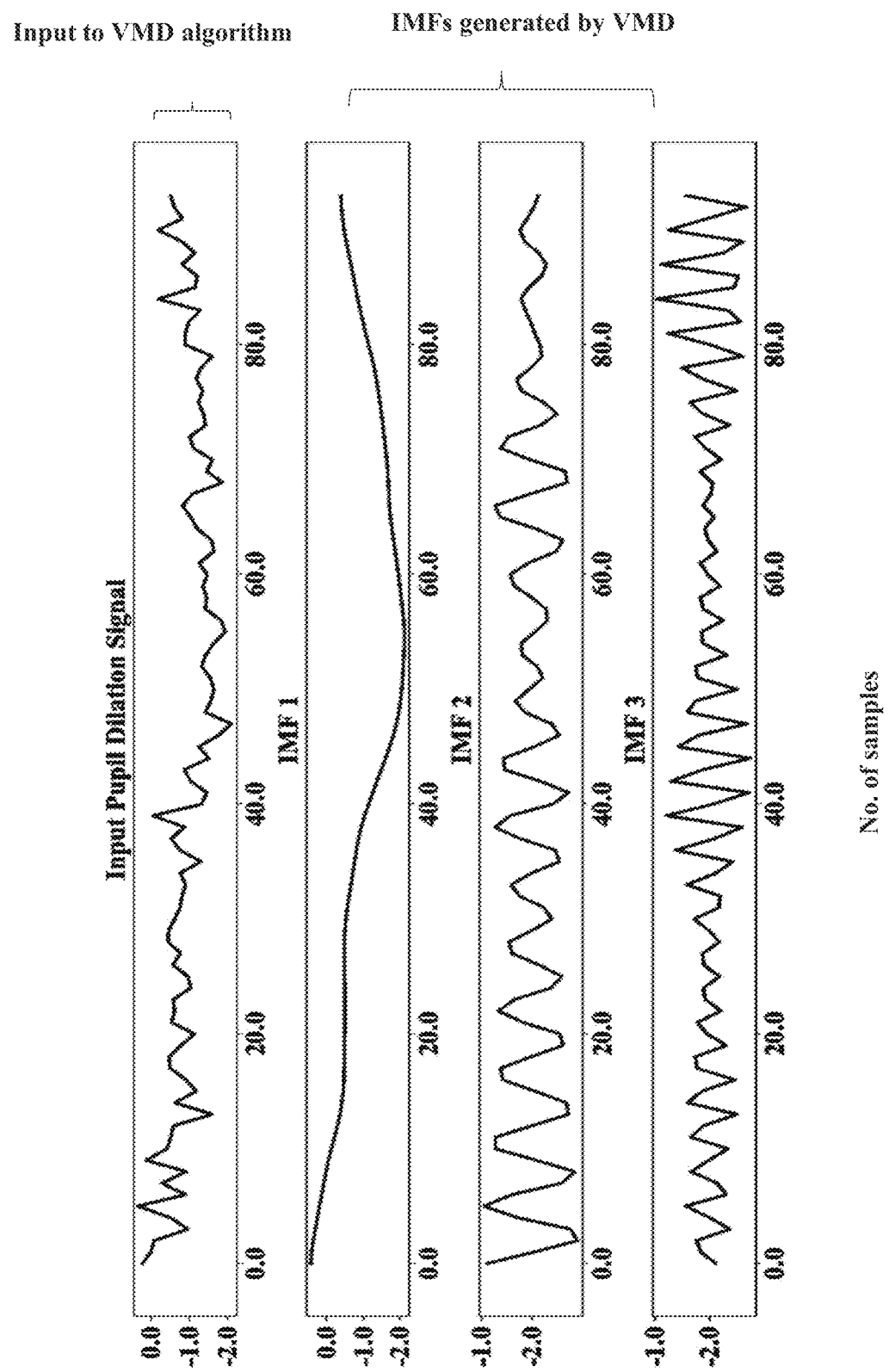
FIG. 6C illustrates decomposition of a second feature associated with a pupil dilation feature where baseline pupil dilation feature using the system of FIG. 1, in accordance with some embodiments of the present disclosure.

Referring now to FIG. 6C, the decomposition obtained using the VMD for the given baseline pupil dilation signal, the three modes are the multidimensional representation of the univariate pupil dilation signal. The decomposition is obtained by considering K=3 modes which denotes three top frequencies (ω) in the baseline pupil dilation signal. Determining the ideal $\omega_k$ corresponding to $u_k$ to form the signature signal Ψ for a given participant should follow the following objective function as in Equation 10, $$\min_{u_k}\{1 - F(u_k \otimes X)\}; \quad \forall k = 1, 2, \ldots, K \quad \text{Equation 10}$$

where X is the pupil dilation signal in the validation phase when the participant was looking at either the Near, Intermediate or Far distance. F is the learned model that returns the classification result in terms of F1-score in the range [0,1]. The optimization is around searching for the candidate BLIMF ($u_k$, ∀k=1, 2, . . . , K number of modes) which can be used for normalization. Through extensive empirical studies it is noted that the mode $u_1$ is the ideal candidate to be considered as the signature wavelet Ψ. The pupil dilation signal X thus obtained in every case is thereby enhanced as follows in Equation 11, $$\hat{X} = \Psi \otimes X \quad \text{Equation 11}$$

The pupil orientation feature sin (α) and the pupil dilation feature $\hat{X}$ are used together to predict the gazed distance.

At step 312 of the method 300 the one or more hardware processors are configured to classify the gazed object of the subject based on the distance into at least one of a near class, an intermediate class, and a far class. Lastly, for the above example the gazed object of the subject based on the distance is classified into its corresponding class as referred above in FIG. 4A and FIG. 4B.

In one embodiment, the performance of the proposed method is evaluated using the experimental setup based on Pupil Lab's Pupil Core device. Pupil Core is a spectacles like device and it has two IR cameras facing two eyes and a scene camera facing the scene in front of the user. The two IR cameras and the scene camera collect data at 30 Hz having video resolution of 400×400 pixels for IR cameras and 1280×720 pixels for scene camera, respectively. The data is collected using two types of stimulus as described in the previous section. During each stimulus, objects are placed at three different distances which are Near, Intermediate and Far distances, respectively. Each subject is requested to look at those objects based on audio instructions while wearing the pupil core device. Gaze depth ground truth is saved based on timestamps of the audio instructions. The performance of the proposed method is evaluated using classification and regression models. For regression models, stimulus object distances from the participants are considered as ground truths. On the other hand, for creating the classification model, three different distance of stimulus objects (Near, Intermediate or Far) are taken as three different classes (without taking the absolute value of distance). The classification models are evaluated based on two metrics accuracy and F1-score, and regression models are evaluated using mean absolute error (MAE) metric. The impact of mode decomposition based pupil signal enhancement with respect to baseline for determining gaze depth is also evaluated. The potential of the proposed gaze depth estimation method in a real-life use-case for people having RFD condition is studied.

Figure 7A:
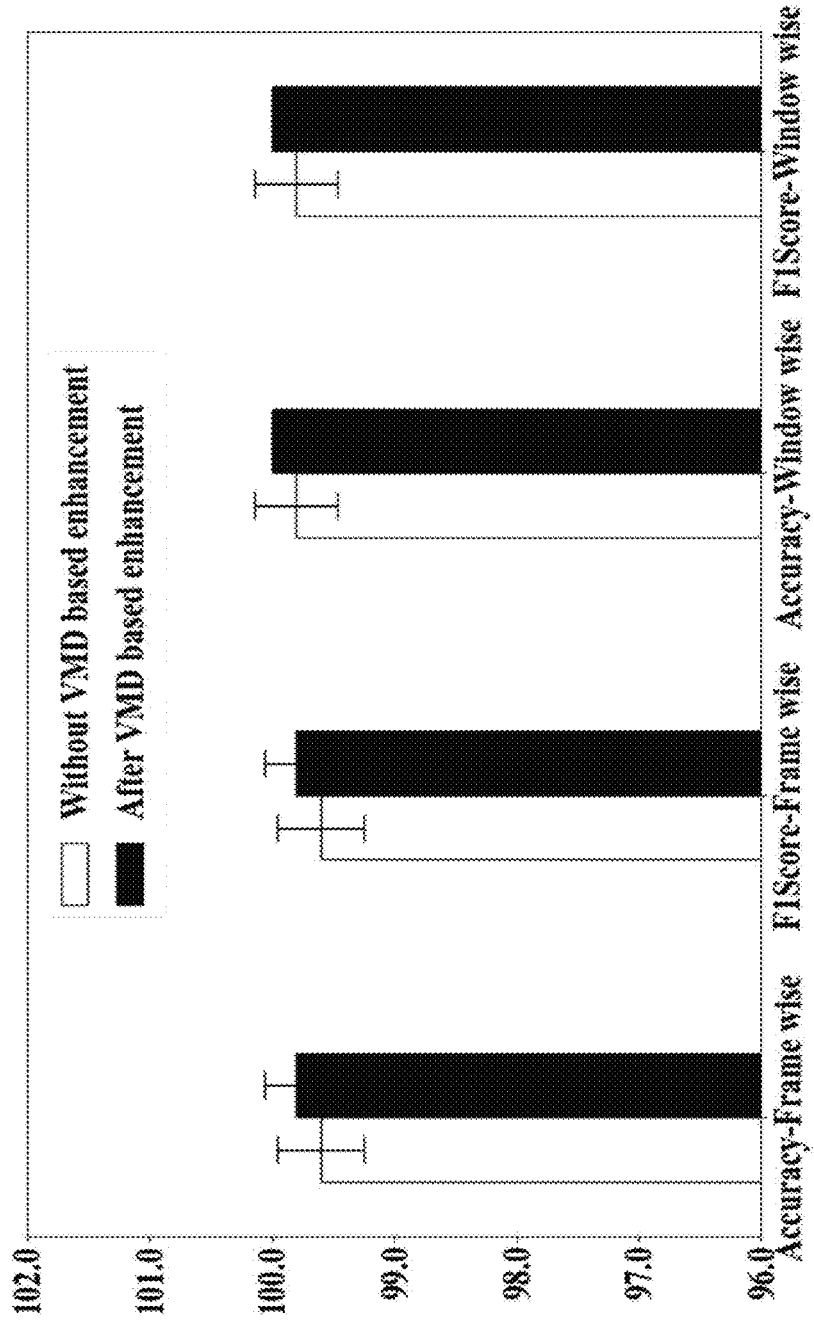
FIG. 7A illustrates the first stimulus classification performance of near and far distance gazed objects with accuracy and F1 score using the system of FIG. 1, in accordance with some embodiments of the present disclosure.
Figure 7B:
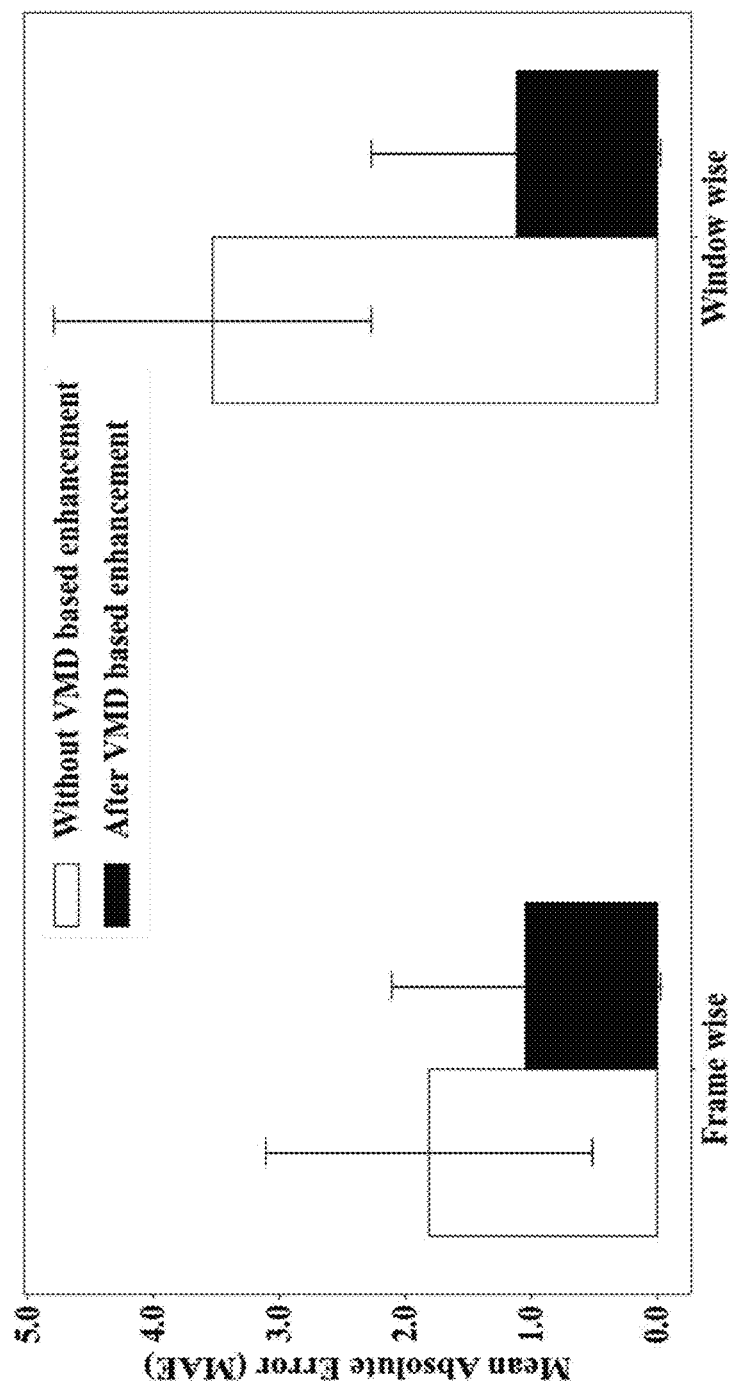
FIG. 7B illustrates the first stimulus regression performance of near and far distance gazed objects with MAE score using the system of FIG. 1, in accordance with some embodiments of the present disclosure.

Referring now FIG. 7A and FIG. 7B, the first stimulus data as discussed earlier considering the real-world scenario about how the subject looks at objects at different distances. First, the models for determining gazed depth class (classification FIG. 7A) and distance (regression as referred in FIG. 7B) are trained and tested considering only near and far data. The trained model performances is evaluated considering both frame wise data and window wise data. Initial three trials of data are used to train the models and last two trials of data are used to evaluate the model performances.

Figure 8A:
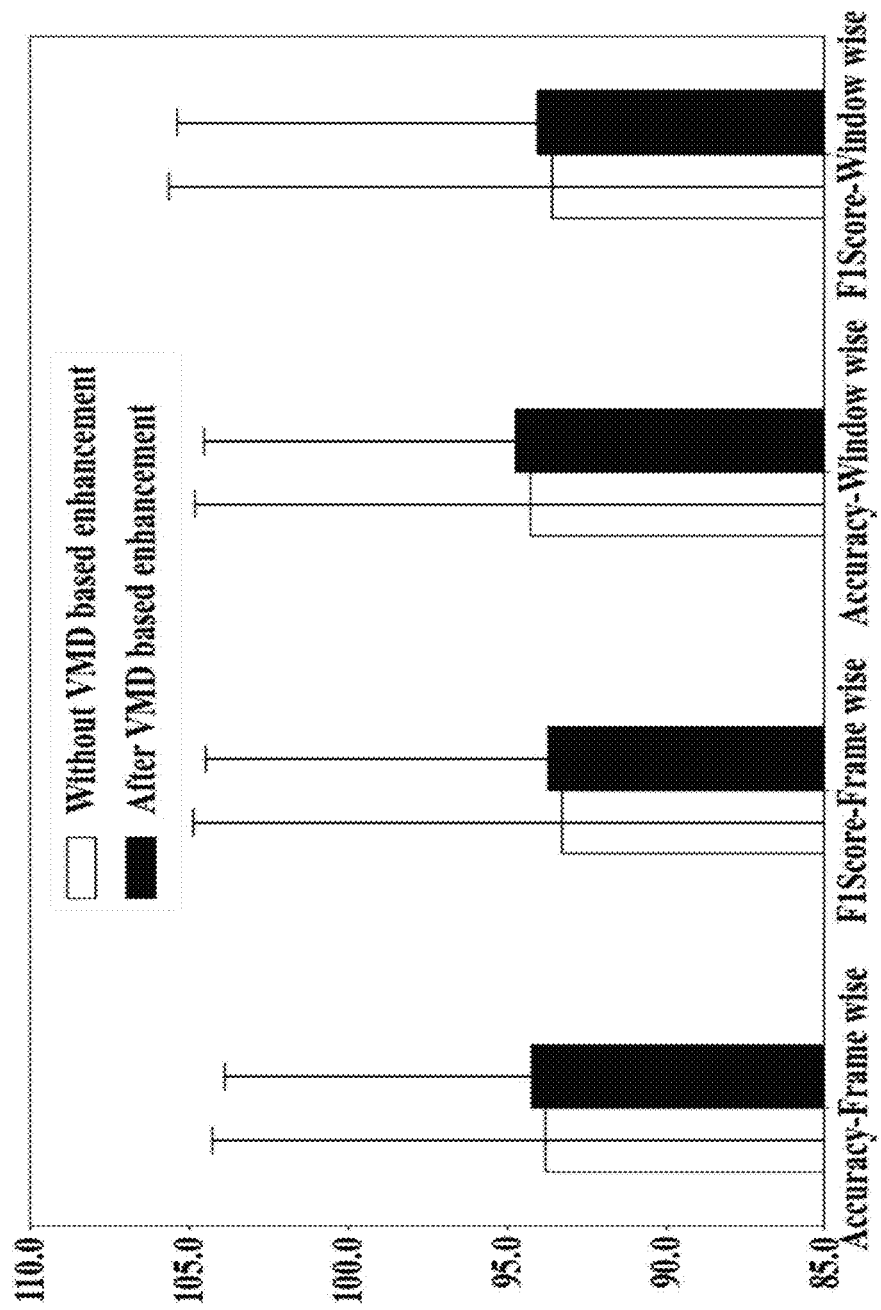
FIG. 8A illustrates the first stimulus classification performance of near, intermediate, and far distance gazed objects with accuracy and F1 score using the system of FIG. 1, in accordance with some embodiments of the present disclosure.
Figure 8B:
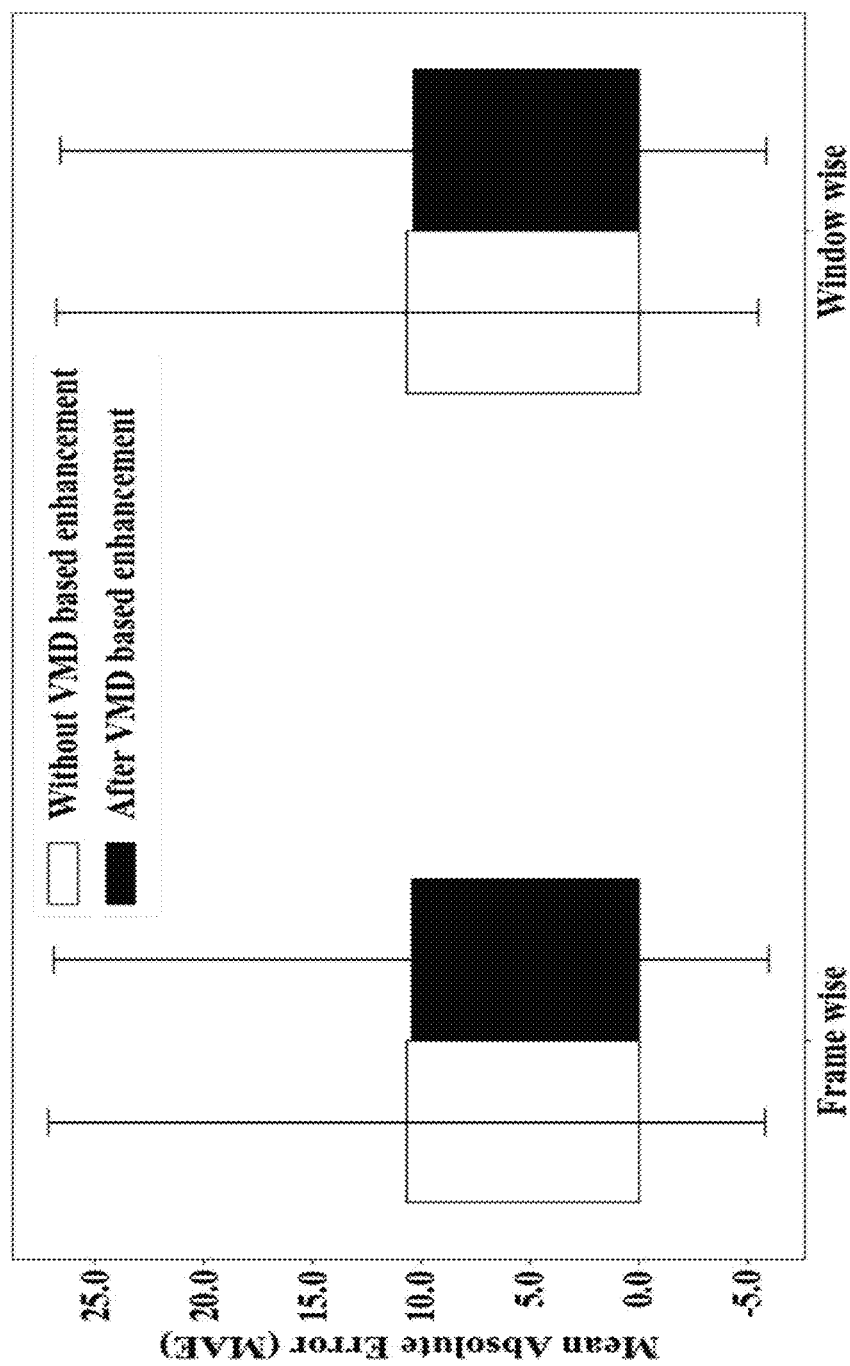
FIG. 8B illustrates the first stimulus regression performance of near, intermediate, and far distance gazed objects with MAE score using the system of FIG. 1, in accordance with some embodiments of the present disclosure.

Referring now FIG. 8A and FIG. 8B, the performance of the model is improved considering frame wise and window wise predictions of gaze depth. For that, the predictions of windows of approximately 300 ms are taken together to predict the final gaze depth. We consider the mode of the window of predictions for classifications and mean of window of predictions for regression analysis, respectively. The frame wise and window wise results are shown in FIG. 8A and FIG. 8B respectively.

Figure 9A:
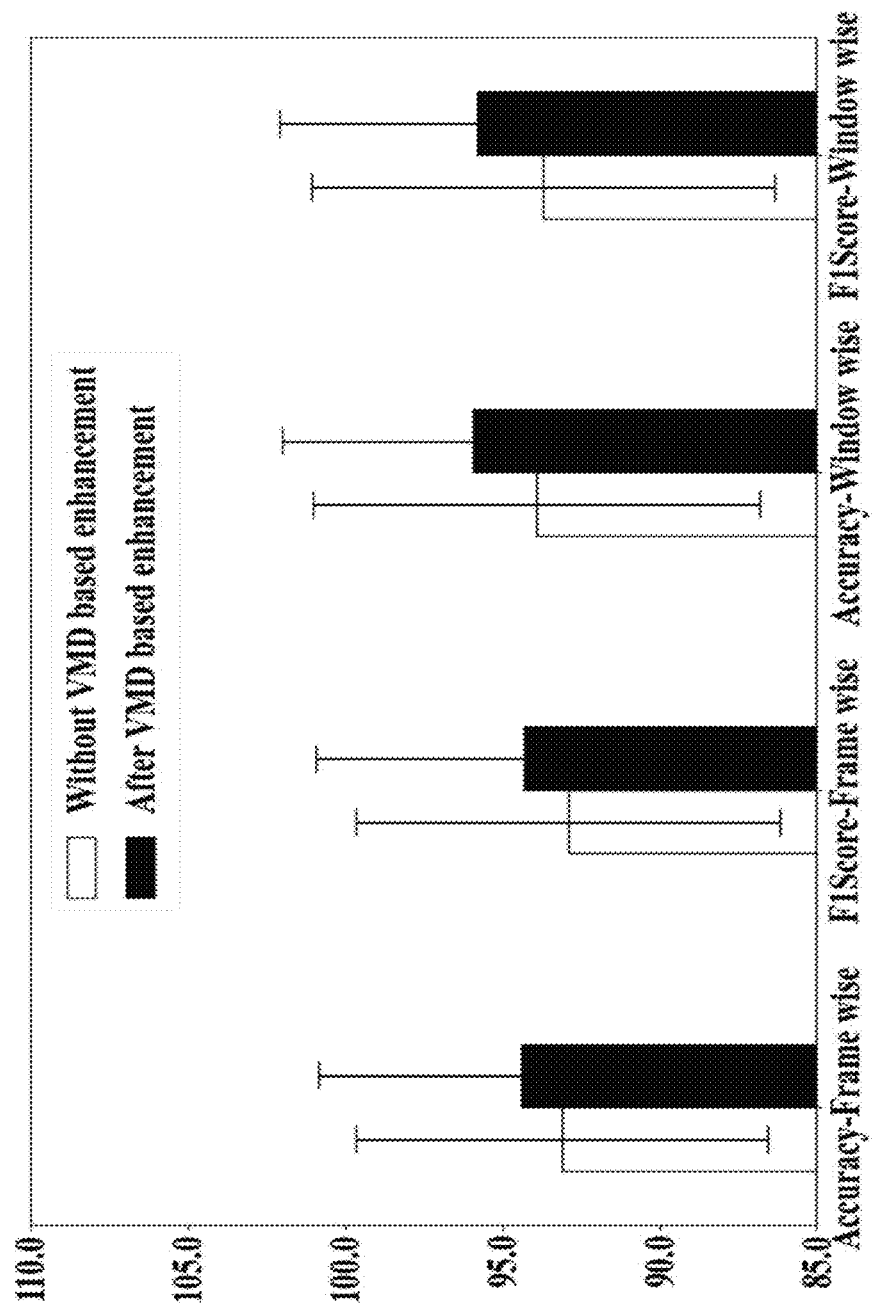
FIG. 9A illustrates the second stimulus classification performance of near and far distance gazed objects with accuracy and F1 score using the system of FIG. 1, in accordance with some embodiments of the present disclosure.
Figure 9B:
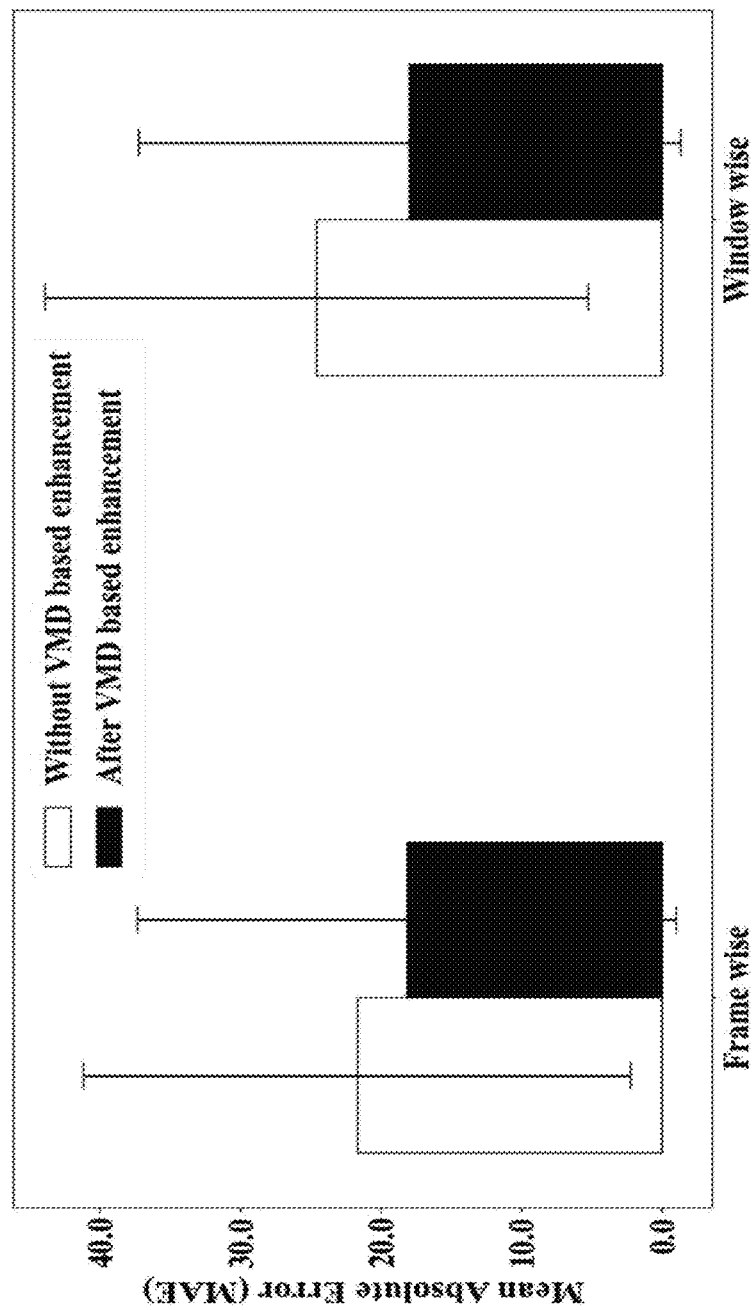
FIG. 9B illustrates the second stimulus regression performance of near and far distance gazed objects with MAE score using the system of FIG. 1, in accordance with some embodiments of the present disclosure.
Figure 10A:
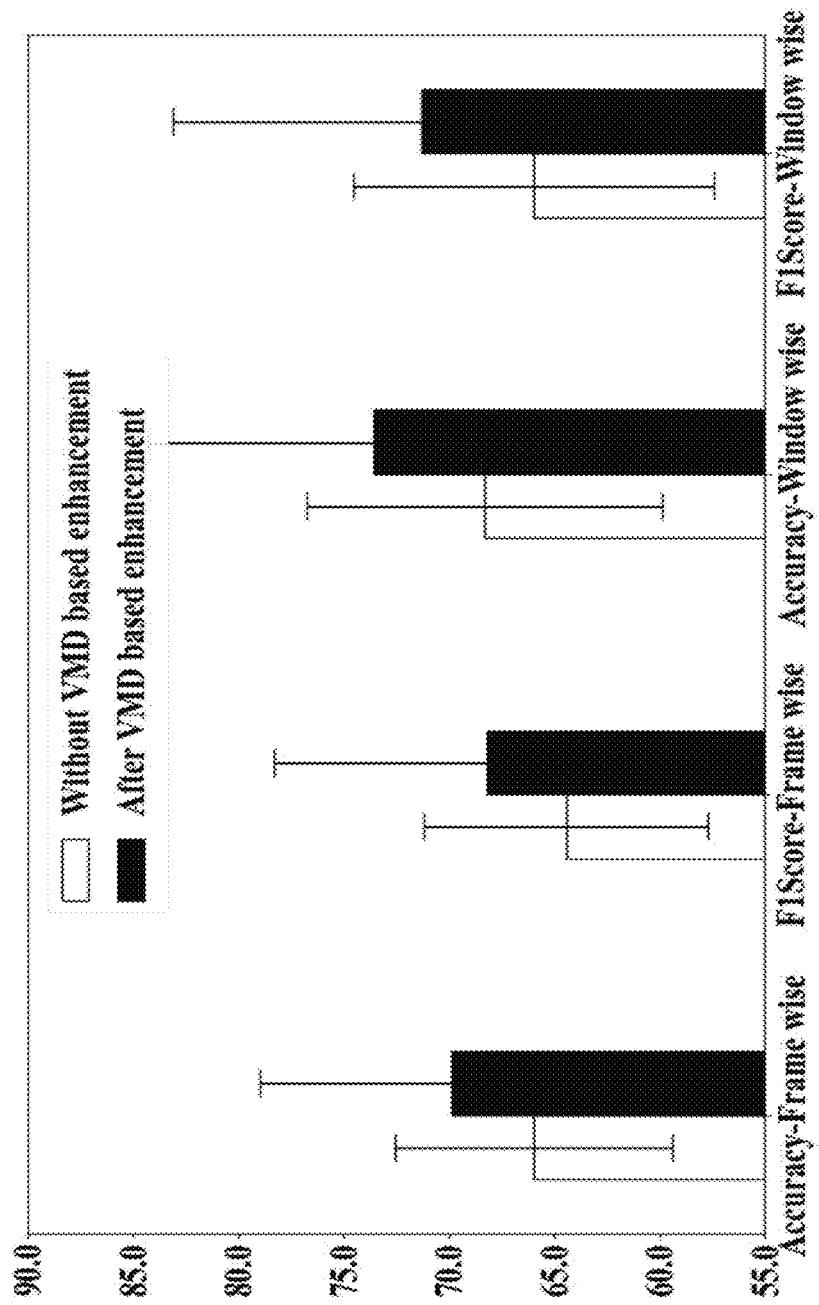
FIG. 10A illustrates the second stimulus classification performance of near, intermediate, and far distance gazed objects with accuracy and F1 score using the system of FIG. 1, in accordance with some embodiments of the present disclosure.
Figure 10B:
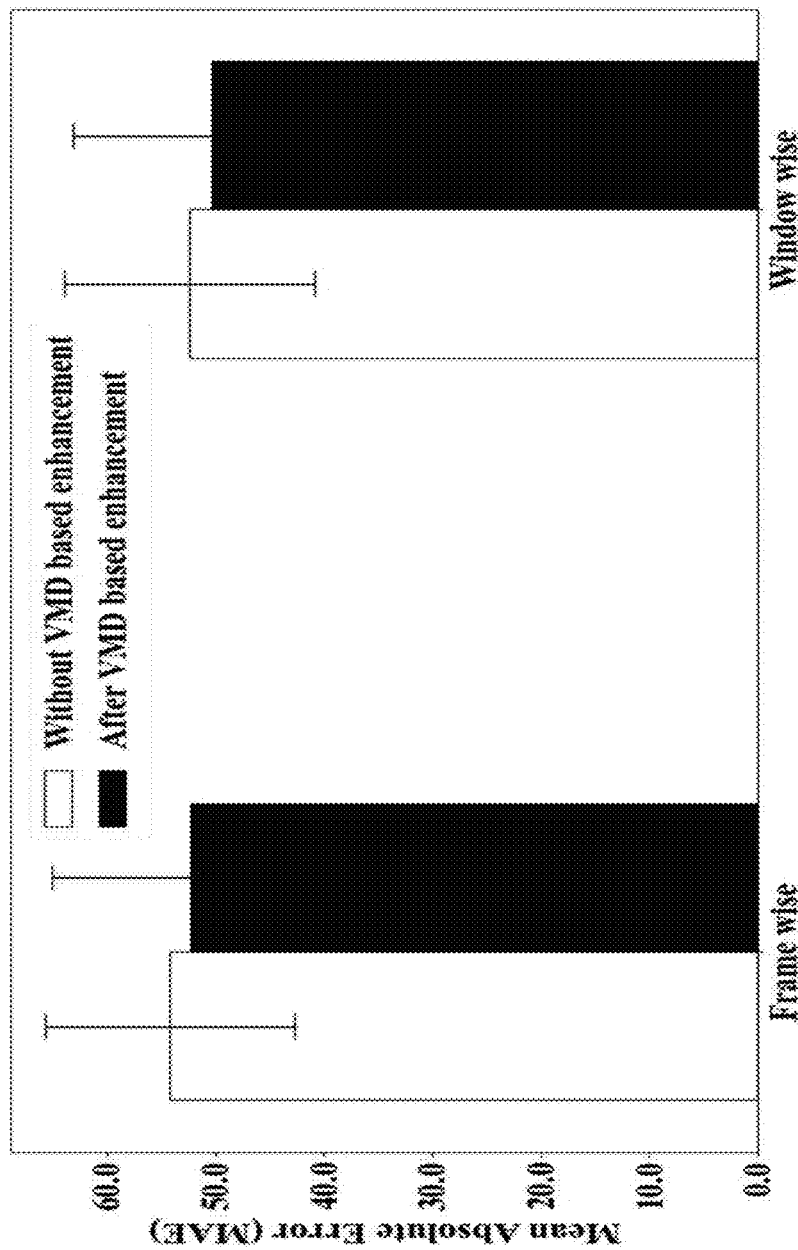
FIG. 10B illustrates the second stimulus regression performance of near, intermediate, and far distance gazed objects with MAE score using the system of FIG. 1, in accordance with some embodiments of the present disclosure.

Referring now FIG. 9A through FIG. 10B On the other hand, the second stimulus is a special scenario where objects at different distances have same height and line of sight from the participants. This scenario occurs rarely due to occlusion. The results are generated using same approach as discussed in previous section. First, considering only near and far distance data and then considering all three distance data. We also evaluated using frame wise and window wise approach. The frame wise and window wise results are shown in FIG. 9A and FIG. 9B, respectively. It is observed that performances of the models are fairly good for gaze depth estimation. Hence, the proposed features are important eye features for gaze depth estimation. The evaluated frame wise and window wise results are shown in FIG. 10A and FIG. 10B respectively. It can be seen that performance of the models are improved than frame wise results for both the first stimulus and the second stimulus data.

Figure 11A:
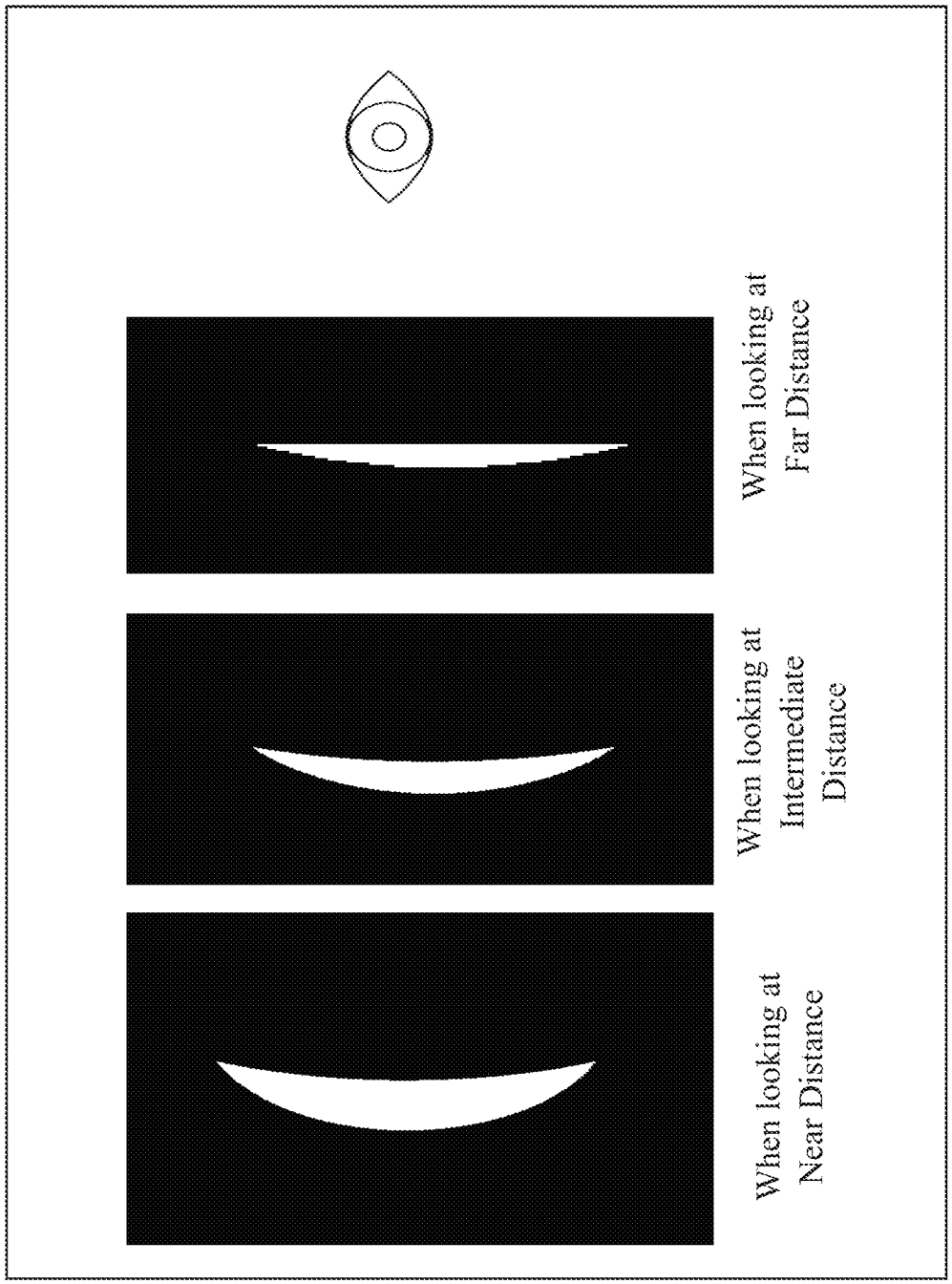
FIG. 11A illustrates a real life application of refractive defects of vision (RFD) correction using focus tunable lenses using the system of FIG. 1, in accordance with some embodiments of the present disclosure.

FIG. 11A illustrates an real life application of RFD correction using focus tunable lenses using the system of FIG. 1, in accordance with some embodiments of the present disclosure. Auto-tunable lenses have emerged as a promising solution for addressing RFD along with near-sightedness, a common age related vision impairment characterized by the loss of near vision accommodation. These lenses exhibit the capability of dynamically adjusting their optical power, or diopter value, to meet the visual needs of the wearer. The diopter values are predetermined and personalized for each individual, based on their vision conditions, refractive error, and visual preferences. The proposed algorithm robustly determines the gaze depth which will facilitate the seamless transition between near, intermediate, and far vision tasks, ensuring optimal visual acuity and comfort for the wearer across varying distances. The proposed algorithm discerns the specific visual task being undertaken by the wearer whether it be reading fine print at close proximity, engaging in computer work at intermediate distances, or viewing distant objects and accordingly instructs the lens to adapt its optical power to facilitate optimal visual performance.

FIG. 11B illustrates an real life application of RFD correction where the subject enters their vision power details before using the system of FIG. 1, in accordance with some embodiments of the present disclosure. FIG. 11B provides user application providing personalized vision powers for the left eye and the right eye. The user application provides options such as "What is your reading power", "What is your intermediate power ?", and "What is your distant vision power ?". The subject can enter their details before using the application and the proposed method uses these values to adjust the power of the lens dynamically using the predicted gaze distance in runtime.

Figure 11C:
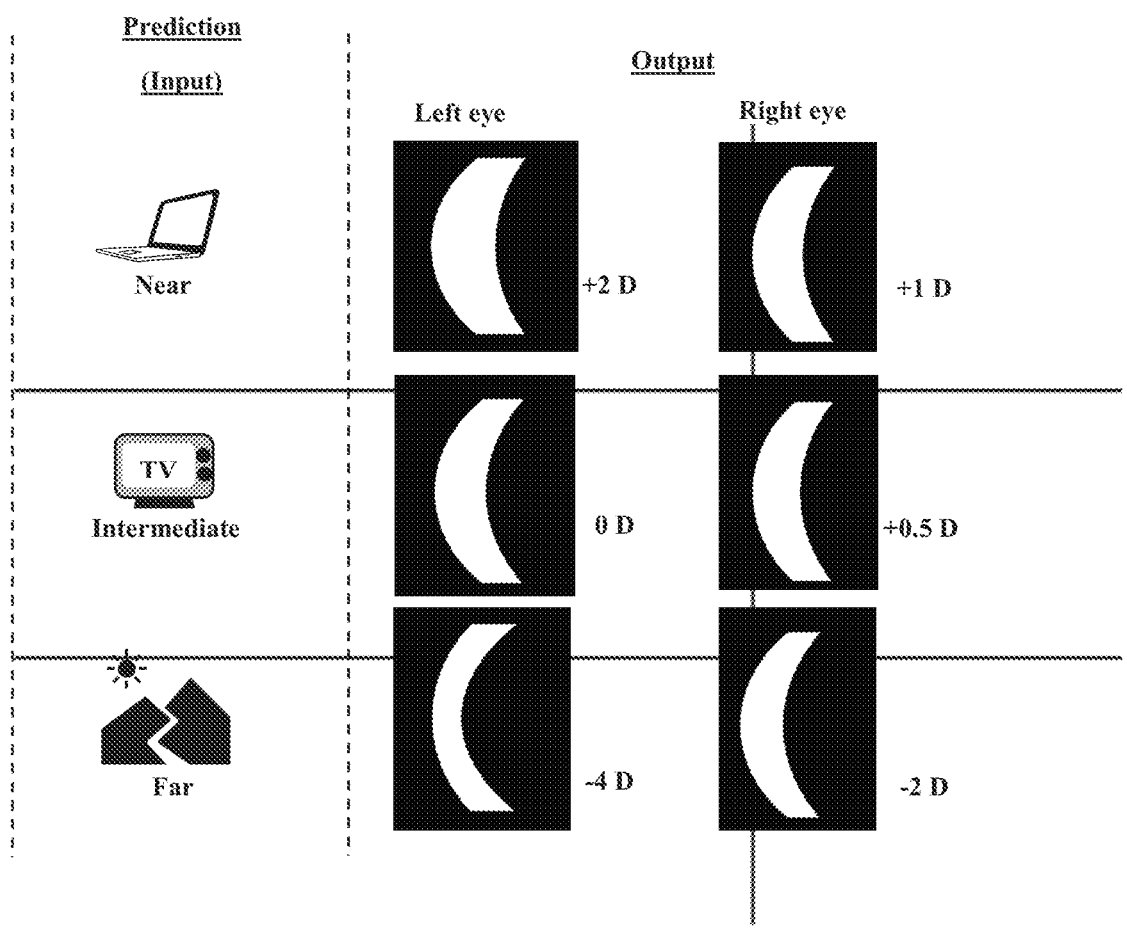
FIG. 11C illustrates an real life application of RFD correction where dynamic changing of lens based on the input diopter values and the gazed object distance predicted using the system of FIG. 1, in accordance with some embodiments of the present disclosure.

FIG. 11C illustrates a real life application of RFD correction where dynamic changing of lens based on the input diopter values and the gazed object distance predicted using the system of FIG. 1, in accordance with some embodiments of the present disclosure. FIG. 11C shows illustration of the relative sizes of auto-tunable lens considering different diopter values for near, intermediate, and far distances. The experimental results provided by the proposed technique can be used to tune the lens, thereby positioning them as a promising avenue for addressing the multifaceted challenges associated with the RFD.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of predicting distance of an object. The embodiment thus provides a method and system for predicting distance of gazed objects using IR camera. Moreover, the embodiments herein further provide computation efficient and robust prediction model to classify the eye features of the subject. The method is robust, real-time gaze depth estimation solution which leverages the properties of physiological characteristic of eyes while fixating at different distances. The method also addresses the problem of refractive defects of vision and propose the subsequent use of our gaze depth estimation method in correcting this condition. The results establishes the robustness of the proposed system to retrieve depth information from eye images.

The employed gaze predictor ML model consumes around 160 KB of space and during the run time RAM requirement is 10 MB. The employed gaze predictor ML model is computationally scalable and efficient to be deployed in any scenario. The method eliminates blink related noise from typical eye trackers. Additionally, the method directly focuses on distance of the gazed objects in three classes, the noise and errors associated with gaze trackers is ruled out.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for predicting distance of gazed objects, the method comprising:
   pretraining a gaze predictor ML model via one or more hardware processor to predict distance of at least one gazed object positioned from eye of each subject during a systematic execution of a set of tasks;
   receiving via the one or more hardware processors one or more IR images of each eye of each subject for fixed duration as input from a pair of IR cameras configured to either side of a spectacle;
   acquiring via the one or more hardware processors one or more pupillary image information from each pupil of each eye from the one or more IR images;
   extracting from each pupillary information of each pupil via the one or more hardware processors a set of features, and denoising eye blinks from the set of features, wherein the eye blinks from the set of features are denoised by performing the steps of:
      obtaining the one or more pupillary image information from each pupil of each eye;
      storing for each time window each pupillary image information in a temporary array;
      identifying one or more eye blinks from the temporary array;
      identifying a region of interest (ROI) by marking a sub window around each blink;
      interpolating the ROI for each eyeblink based on ($x_L$, $y_L$) which is leftmost data point in the ROI and ($x_R$, $y_R$) is the rightmost point in the ROI; and
      applying a smoothening filter over each pupillary image information in the temporary array to remove sharp points from each eye blink;
   predicting via the one or more hardware processors a distance of a gazed object from current location of the subject using the gaze predictor ML model and the set of features; and
   classifying via the one or more hardware processors the gazed object of the subject based on the distance into at least one of a near class, an intermediate class, and a far class.

2. The processor-implemented method as claimed in claim 1, wherein the set of features comprises a pupil orientation feature and a pupil dilation feature.

3. The processor-implemented method as claimed in claim 2, wherein the pupil orientation feature for each pupil of each eye is extracted by performing the steps of:
   projecting each pupillary image information in a 2D plane;
   computing an alpha angle ($\alpha$) for each pupillary image information, wherein the
   alpha angle is an angle between a minor axis and a horizontal component of at least one eye of the subject gazing the angle;
   denoising the alpha angle ($\alpha$) from the eye blinks and taking sine of the alpha angle; and
   extracting the pupil orientation feature from the alpha angle.

4. The processor-implemented method as claimed in claim 2, wherein the pupil dilation feature for each pupil of each eye is extracted by performing the steps of:
   estimating a major axis and a minor axis of each pupil;
   utilizing the pupil orientation feature to obtain a vertical component of each pupil from the major axis and the minor axis; and
   extracting the pupil dilation feature from the estimate of the vertical component of each pupil.

5. The processor-implemented method as claimed in claim 2, wherein the gaze predictor ML model is trained by performing the steps of:

generating a training dataset from each subject by performing the systematic execution of the set of tasks where the subject gazes at the object;

utilizing the training dataset to extract the pupil orientation feature by normalizing the pupil orientation feature with respect to a baseline pupil orientation signal, wherein the baseline pupil orientation signal is obtained during initial calibration phase when the subject gazes at the object from the current location to the far distance;

utilizing the training dataset to extract a pupil dilation signal feature by executing the steps of:
normalizing a pupil dilation signal using a baseline pupil dilation signal, wherein the baseline pupil dilation signal is obtained during the initial calibration phase when the subject gazes at the object from the current location to the far distance;
enhancing the pupil dilation signal with a convolution of signature wavelet, wherein the signature wavelet is estimated during the initial calibration phase when subject gazes at the object from the current location to the far distance;
inputting the baseline pupil dilation signal into a variational Mode Decomposition (VMD) technique which decomposes the baseline pupil dilation signal into discrete modes where each mode is compact with center frequency to obtain an intrinsic mode functions (IMFs) for each mode as output;
performing optimization around each intrinsic mode functions (IMFs) which is an ideal signature wavelet capturing the gaze distance of the object from the current location to the far distance; and
enhancing the pupil dilation feature obtaining in runtime each pupil dilation feature subjected to convolution with the signature wavelet to maximize gazed depth related component in the pupil dilation signal and to suppress rest.

6. A system for predicting distance of gazed objects, comprising:
a memory storing instructions;
one or more communication interfaces; and
one or more hardware processors coupled to the memory via the one or more communication interfaces, wherein the one or more hardware processors are configured by the instructions to:
pretrain a gaze predictor ML model to predict distance of at least one gazed object positioned from eye of each subject during a systematic execution of a set of tasks;
receive one or more IR images of each eye of each subject for fixed duration as input from a pair of IR cameras configured to either side of a spectacle;
acquire one or more pupillary image information from each pupil of each eye from the one or more IR images;
extract from each pupillary information of each pupil a set of features, and denoising eye blinks from the set of features, wherein the eye blinks from the set of features are denoised by performing the steps of:
obtaining the one or more pupillary image information from each pupil of each eye;
storing for each time window each pupillary image information in a temporary array;
identifying one or more eye blinks from the temporary array;
identifying a region of interest (ROI) by marking a sub window around each blink;
interpolating the ROI for each eyeblink based on ($x_L$, $y_L$) which is leftmost data point in the ROI and ($x_R$, $y_R$) is the rightmost point in the ROI; and
applying a smoothening filter over each pupillary image information in the temporary array to remove sharp points from each eye blink;
predict a distance of a gazed object from current location of the subject using the gaze predictor ML model and the set of features; and
classify the gazed object of the subject based on the distance into at least one of a near class, an intermediate class, and a far class.

7. The system as claimed in claim 6, wherein the set of features comprises a pupil orientation feature and a pupil dilation feature.

8. The system as claimed in claim 7, wherein the pupil orientation feature for each pupil of each eye is extracted by performing the steps of:
projecting each pupillary image information in a 2D plane;
computing an alpha angle ($\alpha$) for each pupillary image information, wherein the alpha angle is an angle between a minor axis and a horizontal component of at least one eye of the subject gazing the angle;
denoising the alpha angle ($\alpha$) from the eye blinks and taking sine of the alpha angle; and
extracting the pupil orientation feature from the alpha angle.

9. The system as claimed in claim 7, wherein the pupil dilation feature for each pupil of each eye is extracted by performing the steps of:
estimating a major axis and a minor axis of each pupil;
utilizing the pupil orientation feature to obtain a vertical component of each pupil from the major axis and the minor axis; and
extracting the pupil dilation feature from the estimate of the vertical component of each pupil.

10. The system as claimed in claim 7, wherein the gaze predictor ML model is trained by performing the steps of:
generating a training dataset from each subject by performing the systematic execution of the set of tasks where the subject gazes at the object;
utilizing the training dataset to extract the pupil orientation feature by normalizing the pupil orientation feature with respect to a baseline pupil orientation signal, wherein the baseline pupil orientation signal is obtained during initial calibration phase when the subject gazes at the object from the current location to the far distance;
utilizing the training dataset to extract a pupil dilation signal feature by executing the steps of:
normalizing a pupil dilation signal using a baseline pupil dilation signal, wherein the baseline pupil dilation signal is obtained during the initial calibration phase when the subject gazes at the object from the current location to the far distance;
enhancing the pupil dilation signal with a convolution of signature wavelet, wherein the signature wavelet is estimated during the initial calibration phase when subject gazes at the object from the current location to the far distance;
inputting the baseline pupil dilation signal into a variational mode decomposition (VMD) technique which decomposes the baseline pupil dilation signal into discrete modes where each mode is compact with center frequency to obtain an intrinsic mode functions (IMFs) for each mode as output;

performing optimization around each intrinsic mode functions (IMFs) which is an ideal signature wavelet capturing the gaze distance of the object from the current location to the far distance; and enhancing the pupil dilation feature obtaining in runtime each pupil dilation feature subjected to convolution with the signature wavelet to maximize gazed depth related component in the pupil dilation signal and to suppress rest.

11. One or more non-transitory machine-readable information storage mediums comprising one or more instructions which when executed by one or more hardware processors cause:

pretraining a gaze predictor ML model to predict distance of at least one gazed object positioned from eye of each subject during a systematic execution of a set of tasks;

receiving one or more IR images of each eye of each subject for fixed duration as input from a pair of IR cameras configured to either side of a spectacle;

acquiring one or more pupillary image information from each pupil of each eye from the one or more IR images;

extracting from each pupillary information of each pupil a set of features, and denoising eye blinks from the set of features, wherein the eye blinks from the set of features are denoised by performing the steps of:

obtaining the one or more pupillary image information from each pupil of each eye;

storing for each time window each pupillary image information in a temporary array;

identifying one or more eye blinks from the temporary array;

identifying a region of interest (ROI) by marking a sub window around each blink;

interpolating the ROI for each eyeblink based on ($x_L$, $y_L$) which is leftmost data point in the ROI and ($x_R$, $y_R$) is the rightmost point in the ROI; and applying a smoothening filter over each pupillary image information in the temporary array to remove sharp points from each eye blink;

predicting a distance of a gazed object from current location of the subject using the gaze predictor ML model and the set of features; and classifying the gazed object of the subject based on the distance into at least one of a near class, an intermediate class, and a far class.

12. The one or more non-transitory machine-readable information storage mediums of claim 11, wherein the set of features comprises a pupil orientation feature and a pupil dilation feature.

13. The one or more non-transitory machine-readable information storage mediums of claim 12, wherein the pupil orientation feature for each pupil of each eye is extracted by performing the steps of:

projecting each pupillary image information in a 2D plane;

computing an alpha angle ($\alpha$) for each pupillary image information, wherein the alpha angle is an angle between a minor axis and a horizontal component of at least one eye of the subject gazing the angle;

denoising the alpha angle ($\alpha$) from the eye blinks and taking sine of the alpha angle; and extracting the pupil orientation feature from the alpha angle.

14. The one or more non-transitory machine-readable information storage mediums of claim 12, wherein the pupil dilation feature for each pupil of each eye is extracted by performing the steps of:

estimating a major axis and a minor axis of each pupil;

utilizing the pupil orientation feature to obtain a vertical component of each pupil from the major axis and the minor axis; and extracting the pupil dilation feature from the estimate of the vertical component of each pupil.

15. The one or more non-transitory machine-readable information storage mediums of claim 12, wherein the gaze predictor ML model is trained by performing the steps of:

generating a training dataset from each subject by performing the systematic execution of the set of tasks where the subject gazes at the object;

utilizing the training dataset to extract the pupil orientation feature by normalizing the pupil orientation feature with respect to a baseline pupil orientation signal, wherein the baseline pupil orientation signal is obtained during initial calibration phase when the subject gazes at the object from the current location to the far distance;

utilizing the training dataset to extract a pupil dilation signal feature by executing the steps of:

normalizing a pupil dilation signal using a baseline pupil dilation signal, wherein the baseline pupil dilation signal is obtained during the initial calibration phase when the subject gazes at the object from the current location to the far distance;

enhancing the pupil dilation signal with a convolution of signature wavelet, wherein the signature wavelet is estimated during the initial calibration phase when subject gazes at the object from the current location to the far distance;

inputting the baseline pupil dilation signal into a variational Mode Decomposition (VMD) technique which decomposes the baseline pupil dilation signal into discrete modes where each mode is compact with center frequency to obtain an intrinsic mode functions (IMFs) for each mode as output;

performing optimization around each intrinsic mode functions (IMFs) which is an ideal signature wavelet capturing the gaze distance of the object from the current location to the far distance; and enhancing the pupil dilation feature obtaining in runtime each pupil dilation feature subjected to convolution with the signature wavelet to maximize gazed depth related component in the pupil dilation signal and to suppress rest.

* * * * *